United States Patent
Suzuki et al.

(10) Patent No.: US 7,056,963 B2
(45) Date of Patent: Jun. 6, 2006

(54) POLYESTER RESIN COMPOSITION AND PROCESS FOR THE PREPARATION THEREOF

(75) Inventors: Noriyuki Suzuki, Settsu (JP); Kazuhiro Hara, Settsu (JP)

(73) Assignee: Kaneka Corporation, Osaka (JP)

( * ) Notice: Subject to any disclaimer, the term of this patent is extended or adjusted under 35 U.S.C. 154(b) by 213 days.

(21) Appl. No.: 10/276,798

(22) PCT Filed: May 18, 2001

(86) PCT No.: PCT/JP01/04157
§ 371 (c)(1), (2), (4) Date: May 6, 2003

(87) PCT Pub. No.: WO01/88035
PCT Pub. Date: Nov. 22, 2001

(65) Prior Publication Data
US 2004/0024139 A1  Feb. 5, 2004

(30) Foreign Application Priority Data

| May 19, 2000 | (JP) | ............................. 2000-147809 |
| May 19, 2000 | (JP) | ............................. 2000-147810 |
| May 19, 2000 | (JP) | ............................. 2000-147811 |
| May 22, 2000 | (JP) | ............................. 2000-150187 |
| May 22, 2000 | (JP) | ............................. 2000-150188 |
| Aug. 23, 2000 | (JP) | ............................. 2000-252745 |

(51) Int. Cl.
C08K 9/04 (2006.01)
C08K 3/34 (2006.01)

(52) U.S. Cl. ................... 523/209; 523/205; 523/216; 524/377; 524/445; 524/447; 524/449

(58) Field of Classification Search ........ 523/205–206, 523/209, 216; 524/377, 445, 447, 449
See application file for complete search history.

(56) References Cited

U.S. PATENT DOCUMENTS

| 5,164,417 | A | 11/1992 | Anderson |
| 5,578,672 | A | 11/1996 | Beall et al. |
| 6,287,992 | B1 * | 9/2001 | Polansky et al. ............. 442/59 |
| 6,395,386 | B1 * | 5/2002 | Bagrodia et al. ........... 428/323 |
| 6,423,768 | B1 * | 7/2002 | Khouri ....................... 524/445 |
| 6,583,208 | B1 * | 6/2003 | Suzuki ....................... 524/445 |
| 6,610,772 | B1 * | 8/2003 | Clauberg et al. ............ 524/445 |

FOREIGN PATENT DOCUMENTS

| EP | 0 604 080 A | 6/1994 |
| EP | 000899301 A1 * | 3/1999 |
| EP | 0 952 187 A | 10/1999 |
| JP | 46-005389 | 11/1971 |
| JP | 47-013860 | 4/1972 |
| JP | 51-019858 | 6/1976 |
| JP | 51-039271 | 10/1976 |
| JP | 52-102255 | 8/1977 |
| JP | 09-118518 | 5/1997 |
| JP | 10-060160 | 3/1998 |
| JP | 10-259016 | 9/1998 |
| JP | 10-306205 | 11/1998 |
| JP | 10-310420 | 11/1998 |
| JP | 11-140286 | 5/1999 |
| WO | WO 99-07790 | 2/1999 |
| WO | WO 99-23162 | 5/1999 |

* cited by examiner

Primary Examiner—Peter Szekely
(74) Attorney, Agent, or Firm—Kenyon & Kenyon LLP

(57) ABSTRACT

This invention is related to a polyester resin composition comprising:
  a thermoplastic polyester resin and
  a polyether compound-treated layered material having layers respectively exfoliated by one another,
  which satisfies at least one of the conditions (i) to (v) given below:
    (i) That said polyether compound has a hydroxyl value of not more than 30 mg KOH/g;
    (ii) That said polyether compound has a cyclic hydrocarbon group:
    (iii) That said polyester resin composition comprises a phosphorus-containing compound;
    (iv) That said polyester resin composition comprises an epoxy-containing compound;
    (v) That said polyester resin composition is obtainable by melt-kneading the thermoplastic polyester resin and the polyether compound-treated layered material having layers respectively exfoliated by one another and then treating the mixture for increasing the molecular weight of the polyester resin.

18 Claims, No Drawings

POLYESTER RESIN COMPOSITION AND PROCESS FOR THE PREPARATION THEREOF

TECHNICAL FIELD

The present invention relates to a polyester resin composition and a method of producing the same.

BACKGROUND ART

Thermoplastic polyester resins such as polyethylene terephthalate are excellent in heat resistance, chemical resistance, weather resistance, mechanical characteristics and electric characteristics, among others, and, therefore, they are used in various fields of industrial application, for example as injection molding materials, fibers and films. However, still higher levels of mechanical characteristics and heat resistance are required of them. To meet those requirements, attempts have been made to improve such characteristics generally by incorporating various inorganic particles. However, this measure may cause problems: the surface appearance of products may be impaired, or a fibrous inorganic material incorporated may be oriented in the step of injection molding to cause anisotropy.

The above drawbacks of inorganic particles are generally thought to arise from insufficient dispersibility of inorganic particles and/or an excessive size of dispersed particles. Thus, a technology of finely dispersing inorganic particles has been desired.

As regards layered materials, in particular layered phyllosilicates, among inorganic particles, a technology of facilitating the exfoliation of layered phyllosilicates along each foliated platelet to make it easy to finely disperse them by intercalating a high-molecular compound (intercalant polymer) such as polyvinylpyrrolidone between layers to give intercalation compounds has been disclosed (Japanese Kokai Publication Hei-09-118518). The above-cited publication discloses such intercalation compounds but does not disclose any technology of exfoliating the intercalation compounds and finely dispersing them in thermoplastic polyester resins. In fact, it has been difficult to finely disperse layered phyllosilicates in thermoplastic polyester resins.

Separately, the present inventors previously found that for causing exfoliation of layers of a layered phyllosilicate to thereby finely disperse the same in a thermoplastic polyester resin, it is particularly effective to treat the layered phyllosilicate with a polyether compound to convert the same to a clay-derived intercalation compound and disclosed a technology relative to a polyester resin composition comprising a thermoplastic polyester resin and a clay-derived intercalation compound (Japanese Kokai Publication Hei-10-259016, Japanese Kokai Publication Hei-10-310420). That technology has made it possible to increase the mechanical characteristics, such as elastic modulus, and heat resistance without causing any impairment in surface appearance or warpage. However, in a molten state, the thermoplastic polyester resin reacts with the polyether compound and the resin is decomposed thereby and, therefore, the thermal stability in molten state cannot be said to be high enough and the strength of moldings tends to decrease due to residence in molten state. In certain instances, as the resin repeatedly experiences a molten state, the viscosity of the resin decreases and the processability into moldings becomes degraded.

On the other hand, a technology is disclosed which uses a polyfunctional compound having two or more epoxy or carbodiimide groups in each molecule to increase the molecular weight of a polyester resin reduced in molecular weight as a result of decomposition (e.g. Japanese Kokai Publication Sho-46-5389, Japanese Kokoku Publication Sho-47-13860, etc.). It is generally known that the above technology is effective in retaining the impact strength, in particular the strength after exposure of high-temperature, high-humidity conditions, of thermoplastic polyester resins. However, there remain the problems of degradation in processability into moldings; for example, the fluidity of the resin decreases upon experience with a molten state.

Further, the present inventors previously disclosed an invention directed to a method of production which comprises melt-kneading a mixture of diol-treated inorganic particles and a thermoplastic polyester resin and then performing a polymerization procedure (Japanese Kokai Publication Hei-10-306205) and an invention concerning a production method which comprises melt-kneading a mixture of a bishydroxyalkyl terephthalate and inorganic particles together with a thermoplastic polyester resin to thereby cause polymerization (Japanese Kokai Publication Hei-11-140286). However, both methods may require a prolonged production time in certain cases.

Meanwhile, thermoplastic polyester polymer resins are widely used in automotive parts, electronic and electrical appliance parts, OA (office automation) equipment parts and the like. In these fields of application, materials are demanded which have not only good mechanical characteristics, heat resistance and moldability but also high flame retardancy. A number of methods have been proposed for rendering polyester resins flame-retardant using phosphorus compounds (e.g. Japanese Kokoku Publication Sho-51-19858, Japanese Kokoku Publication Sho-51-39271, Japanese Kokai Publication Sho-52-102255). However, the use of a phosphorus compound results in reduced mechanical characteristics, among others, and, in addition, raises the problem that if it is attempted to attain flame retardancy with a phosphorus compound alone, the resin melting on exposure to flames drips together with kindling seeds.

For suppressing the dripping of the resin exposed to flames, a technology is known which generally uses a fluororesin combinedly. However, although this prior art technology is effective to a certain extent in suppressing the dripping on the occasion of combustion, the use of a fluororesin in an amount of less than about 1 part by weight per 100 parts by weight of a polyester resin results in failure to attain stable flame retardancy due to poor dispersibility of the fluororesin. Conversely, the use thereof in an increased amount produces problems, such as an increased cost, an impairment in surface appearance of resin moldings due to poor dispersibility of the fluororesin, and decreases in fluidity and processability in molding.

Another technology has also been disclosed (Japanese Kokai Publication Hei-10-60160) which uses a layered phyllosilicate with a mean particle size of 0.5 to 300 μm in combination with a phosphorus-containing flame retardant. However, this technology is not yet fully satisfactory in dripping-suppressing effect since even when such a layered phyllosilicate with a mean particle size of 0.5 to 300 μm is used, the particle size is still too large. While the term "mean particle size" is interpreted to mean that the particles are indefinite in shape or are generally spherical, it is desirable for such particles to have a thin plate-like shape with a high aspect ratio so that a sufficient dripping-suppressing effect can be efficiently achieved.

SUMMARY OF THE INVENTION

In view of the above state of the art, it is an object of the present invention to provide a polyester resin composition excellent in processability into moldings as a result of stabilization of the melt viscosity thereof on the occasion of retention in a molten state and capable of providing moldings well balanced among physical characteristics, such as low warpage, surface appearance, elastic modulus and strength, and heat resistance, with suppression of reduction in strength of moldings formed after retention in a molten state as a result of improvement in thermal stability in molten state.

Another object of the invention, in addition to the above object, is to provide a polyester resin composition having a high level of flame retardancy such that the polyester resin will not drip on the occasion of combustion.

A further object of the invention is to provide a method of producing such a polyester resin composition as mentioned above efficiently.

The present invention thus provides a polyester resin composition comprising:
a thermoplastic polyester resin and
a polyether compound-treated layered material having layers respectively exfoliated by one another,
which satisfies at least one of the conditions (i) to (v) given below:
(i) That said polyether compound has a hydroxyl value of not more than 30 mg KOH/g;
(ii) That said polyether compound has a cyclic hydrocarbon group:
(iii) That said polyester resin composition comprises a phosphorus-containing compound;
(iv) That the polyester resin composition comprises an epoxy-containing compound;
(v) That said polyester resin composition is obtainable by melt-kneading the thermoplastic polyester resin and the polyether compound-treated layered material having layers respectively exfoliated by one another and then treating the mixture for increasing the molecular weight of the polyester resin.

The present invention further provides a method of producing a polyester resin composition comprising a thermoplastic polyester resin and a polyether compound-treated layered material having layers respectively exfoliated by one another
which comprises melt-kneading the thermoplastic polyester resin and the polyether compound-treated layered material having layers respectively exfoliated by one another
and then treating the mixture for increasing the molecular weight of the polyester resin.

In the following, the present invention is described in detail.

DETAILED DISCLOSURE OF THE INVENTION

The thermoplastic polyester resin to be used in the practice of the invention may be any of those thermoplastic polyester resins known in the art which are obtainable by reacting an acid component mainly comprising a dicarboxylic acid compound and/or an ester-forming derivative of a dicarboxylic acid and a diol component mainly comprising a diol compound and/or an ester-forming derivative of a diol compound.

The term "mainly comprising" is used herein to indicate that each relevant constituent accounts for not less than 80% or rather not less than 90%, of the acid or diol component, with the upper limit being 100%.

As the aromatic dicarboxylic acid, there may be mentioned, among others, terephthalic acid, isophthalic acid, orthophthalic acid, 2,6-naphthalenedicarboxylic acid, 4,4'-biphenyldicarboxylic acid, 4,4'-diphenyl ether-dicarboxylic acid, 4,4'-diphenylmethanedicarboxylic acid, 4,4'-diphenyl sulfone-dicarboxylic acid, 4,4'-diphenylisopropylidenedicarboxylic acid and the like. Substitution compounds of these (e.g. alkyl-substituted compounds such as methylisophthalic acid) and derivatives thereof (dimethyl terephthalate, dimethyl 2,6-naphthalenedicarboxylate, etc.) can also be used. Further, oxy acids such as p-oxybenzoic acid and p-hydroxyethoxybenzoic acid as well as ester-forming derivatives thereof may also be used. It is also possible to use one or more of these monomers in admixture. One or more aliphatic dicarboxylic acids such as adipic acid, azelaic acid, dodecanedioic acid and sebacic acid may be used in small amounts in admixture with such aromatic dicarboxylic acids unless the characteristics of the resulting polyester resin compositions are impaired.

Among the above-mentioned acid components, terephthalic acid, 2,6-naphthalenedicarboxylic acid, 4,4'-biphenyldicarboxylic acid, and ester-forming derivatives thereof are preferred in view of the crystallinity, strength and elastic modulus of the resulting polyester resins.

As the glycol compound, there may be mentioned aliphatic glycols such as ethylene glycol, propylene glycol, butylene glycol, hexylene glycol and neopentyl glycol, and alicyclic glycols such as 1,4-cyclohexanedimethanol, among others. Substitution compounds and derivatives thereof may also be used. Cyclic esters such as $\epsilon$-caprolactone may also be used. Two or more of these may be used in admixture. Furthermore, long-chain diol compounds (e.g. polyethylene glycol, polytetramethylene glycol) and bisphenol-alkylene oxide adducts (e.g. bisphenol A-ethylene oxide adduct polymers etc.), for instance, may be used combinedly in small amounts unless the elastic modulus of the polyester resins is reduced markedly.

Among the above diol components, ethylene glycol, butylene glycol 1,4-cyclohexanedimethanol and 2,2-bis(4-hydroxyphenyl)propane are preferred in view of the ease of handling thereof and the strength and elastic modulus, among others, of the resulting polyester resins.

A specific examples of the thermoplastic polyester resin, there may be mentioned polyethylene terephthalate, polypropylene terephthalate, polybutylene terephthalate, polyhexamethylene terephthalate, polycyclohexane-1,4-dimethyl terephthalate, neopentyl terephthalate, polyethylene isophthalate, polyethylene naphthalate, polybutylene naphthalate, polyhexamethylene naphthalate and the like as well as copolyesters thereof. These may be used singly or two or more of them may be used in combination.

The molecular weight of the above thermoplastic polyester resin is to be selected taking into consideration the fluidity in the step of molding and various physical properties which the final products should have. It is necessary to select an appropriate molecular weight, not too low or not too high. Thus, the molecular weight of the thermoplastic polyester resin, when expressed in terms of logarithmic viscosity number, should be 0.3 to 2.0 (dl/g), preferably 0.35 to 1.9 (dl/g), more preferably 0.4 to 1.8 (dl/g), as measured at 25° C. using a mixed solvent composed of phenol and tetrachloroethane (weight ratio 5/5). If the logarithmic viscosity number is less than 0.3 (dl/g), the moldings from the resulting polyester resin composition will show low mechanical characteristics and, if it is higher than 2.0 (dl/g), problems tend to arise about processability, for example fluidity, in the step of molding.

The layered material to be used in accordance with the present invention comprises at least one member selected from the group consisting of silicate salts, phosphate salts such as zirconium phosphate, titanate salts such as potassium titanate, tungstenate salts such as sodium tungstenate, uranate salts such as sodium uranate, vanadate salts such as potassium vanadate, molybdenate salts such as magnesium molybdate, niobate salts such as potassium niobate, and graphite. From the ready availability and ease of handling viewpoint, layered phyllosilicates are preferred.

The layered phyllosilicates mentioned above are formed of tetrahedral sheets mainly of silicon oxide and octahedral sheets mainly of a metal hydroxide and include, among others, smectite group clays and swellable mica.

The smectite group clays include natural or synthetic ones represented by the following general formula (3):

$$X1_{0.2-0.6}Y1_{2-3}Z1_4O_{10}(OH)_2 \cdot nH_2O \qquad (3)$$

(wherein X1 represents at least one member selected from the group consisting of K, Na, ½ Ca and ½ Mg, Y1 represents at least one member selected from the group consisting of Mg, Fe, Mn, Ni, Zn, Li, Al and Cr, Z1 represents at least one member selected from the group consisting of Si and Al, $H_2O$ represents a water molecule bonded to an interlayer ion and the number n varies according to the interlayer ion and the relative humidity). As specific examples of the smectite clays, there may be mentioned, among others, montmorillonite, beidellite, nontronite, saponite, iron saponite, hectorite, sauconite, stevensite, bentonite and the like as well as substitution or other derivatives thereof, and mixtures of these. The smectite group clays have a basal space of about 10 to 17 angstroms in the early stage of aggregation and a mean particle size of about 1,000 to 1,000,000 angstroms in the aggregated state.

The swellable mica is natural or synthetic one represented by the general formula (4):

$$X2_{0.5-1.0}Y2_{2-3}(Z2_4O_{10})(F,OH)_2 \qquad (4)$$

(wherein X2 represents at least one member selected from the group consisting of Li, Na, K, Rb, Ca, Ba and Sr, Y2 represents at least one member selected from the group consisting of Mg, Fe, Ni, Mn, Al and Li and Z2 represents at least one member selected from the group consisting of Si, Ge, Al, Fe and B). This mica swells in water, a polar solvent miscible with water in an arbitrary proportion and a mixed solvent composed of water and such a polar solvent and, for example, there may be mentioned lithium type taeniolite, sodium type taeniolite, lithium type tetrasilicic mica, sodium type tetrasilicic mica, substitution or other derivatives thereof, and mixtures of these. The swellable mica has a basal space of about 10 to 17 angstroms in the early stage of aggregation and a mean particle size of about 1,000 to 1,000,000 angstroms in the aggregated state.

Among the swellable mica mentioned above, there are ones resembling in structure to vermiculites and such vermiculite equivalents can also be used. Among such vermiculite equivalents, there are trioctahedral type ones and dioctahedral type ones. Thus, there may be mentioned ones represented by the general formula (5):

$$(Mg,Fe,Al)_{2-3}(Si_{4-x}Al_x)O_{10}(OH)_2 \cdot (M^+,M^{2+}_{1/2})_x \cdot nH_2O \qquad (5)$$

(wherein M represents an exchanging alkali or alkaline earth metal cation such as Na or Mg, x=0.6 to 0.9 and n=3.5 to 5).

The vermiculite equivalents have a basal space of about 10 to 17 angstroms in the early stage of aggregation and a mean particle size of about 1,000 to 5,000,000 angstroms in the aggregated state.

The layered phyllosilicates desirably have a crystal structure such that layers have a highly pure state regularly piled up in the direction of the c axis. However, the so-called mixed layer minerals with the crystal periodicity disturbed and/or a plurality of crystal structures blended therein may also be used.

The layered phyllosilicates may be used singly or two or more of them may be used in combination. Among them, montmorillonite, bentonite, hectorite and interlayer sodium ion-containing swellable mica are preferred in view of their dispersibility in the resulting polyester resin compositions and their physical property improving effects on the polyester resin compositions.

The term "polyether compound" is used herein to indicate a compound the main chain of which is a polyoxyalkylene such as polyoxyethylene or a polyoxyethylene-polyoxypropylene copolymer, with the number of occurrences of the repeating unit being about 2 to 100. The polyether compound may have, on the side chain(s) and/or in the main chain, a substituent or substituents other than Si-containing functional groups capable of forming a Si—O—Si lingkage such as alkoxysilyl groups and silanol groups. It may have any arbitrary substituents unless these adversely affect the thermoplastic polyester resin and/or the layered material. As examples of such substituents, there may be mentioned hydrocarbon groups, groups binding via an ester linkage, epoxy, amino, carboxyl, carbonyl-terminated group, amido, mercapto, groups binding via a sulfonyl linkage, groups binding via a sulfinyl linkage, nitro, nitroso, nitrile, halogen atoms and hydroxyl. The polyether compound may be substituted by one of these substituent species or by two or more of them.

The above-mentioned hydrocarbon groups include straight or branched (i.e. side chain-containing) saturated or unsaturated univalent or polyvalent aliphatic hydrocarbon groups as well as aromatic hydrocarbon groups and alicyclic hydrocarbon groups, for example alkyl groups, alkenyl groups, alkynyl groups, phenyl, naphthyl, and cycloalkyl groups, among others. In the present specification, the term "alkyl groups" is used to include polyvalent hydrocarbon groups such as "alkylene groups", unless otherwise indicated. In the same manner, the alkenyl groups, alkynyl groups, phenyl, naphthyl and cycloalkyl groups include, within the meaning thereof, alkenylene groups, alkynylene groups, phenylene, naphthylene and cycloalkylene groups, respectively.

The content of the substituent(s) in the polyether compound is not particularly restricted but it is desirable that the polyether compound is soluble in water or a water-containing polar solvent. More specifically, the solubility in 100 g of water at room temperature (23° C.), for instance, should be not less than 1 g, preferably not less than 2 g, more preferably not less than 5 g, still more preferably not less than 10 g, most preferably not less than 20 g.

The polar solvent mentioned above includes, among others, alcohols such as methanol, ethanol and isopropanol, glycols such as ethylene glycol, propylene glycol and 1,4-butanediol, ketones such as acetone and methyl ethyl ketone, ethers such as diethyl ether and tetrahydrofuran, amide compounds such as N,N-dimethylformamide and N,N-dimethylacetamide, and other solvents such as pyridine, dimethyl sulfoxide and N-methylpyrrolidone. Carbonate diesters such as dimethyl carbonate and diethyl carbonate may also be used. These polar solvents may be used singly or two or more of them may be used in combination.

As typical examples of the polyether compound to be used in the practice of the present invention, there may be mentioned polyethylene glycol, polypropylene glycol, polytetramethylene glycol, polyethylene glycol-polypropylene glycol, polyethylene glycol-polytetramethylene glycol, polyethylene glycol monomethyl ether, polyethylene glycol dimethyl ether, polyethylene glycol monoethyl ether, polyethylene glycol diethyl ether, polyethylene glycol monoallyl ether, polyethylene glycol diallyl ether, polyethylene glycol monophenyl ether, polyethylene glycol diphenyl ether, polyethylene glycol octyl phenyl ether, polyethylene glycol methyl ethyl ether, polyethylene glycol methyl allyl ether, polyethylene glycol glyceryl ether, polyethylene glycol monomethacrylate, polyethylene glycol monoacrylate, polypropylene glycol monomethacrylate, polypropylene glycol monoacrylate, polyethylene glycol-polypropylene glycol monomethacrylate, polyethylene glycol-polypropylene glycol monoacrylate, polyethylene glycol-polytetramethylene glycol monomethacrylate, polyethylene glycol-polytetramethylene glycol monoacrylate, methoxypolyethylene glycol monomethacrylate, methoxypolyethylene glycol monoacrylate, octoxypolyethylene glycol-polypropylene glycol monomethacrylate, octoxypolyethylene glycol-polypropylene glycol monoacrylate, lauroxypolyethylene glycol monomethacrylate, lauroxypolyethylene glycol monoacrylate, stearoxypolyethylene glycol monomethacrylate, stearoxypolyethylene glycol monoacrylate, allyloxypolyethylene glycol monomethacrylate, allyloxypolyethylene glycol monoacrylate, nonylphenoxypolyethylene glycol monomethacrylate, nonylphenoxypolyethylene glycol monoacrylate, polyethylene glycol dimethacrylate, polyethylene glycol diacrylate, polyethylene glycol-polytetramethylene glycol dimethacrylate, polyethylene glycol-polytetramethylene glycol diacrylate, bis(polyethylene glycol)butylamine, bis(polyethylene glycol)octylamine, polyethylene glycol bisphenol A ether, polyethylene glycol-polypropylene glycol bisphenol A ether, ethylene oxide-modified bisphenol A dimethacrylate, ethylene oxide-modified bisphenol A diacrylate, ethylene oxide-propylene oxide-modified bisphenol A dimethacrylate, polyethylene glycol diglycidyl ether, polyethylene glycol ureidopropyl ether, polyethylene glycol mercaptopropyl ether, polyethylene glycol phenylsulofonylpropyl ether, polyethylene glycol phenylsulfinylpropyl ether, polyethylene glycol nitropropyl ether, polyethylene glycol nitrosopropyl ether, polyethylene glycol cyanoethyl ether, polyethylene glycol cyanoethyl ether, etc. These ether compounds may be used singly or two or more of them may be used in combination.

Among the polyether compounds in accordance with the present invention, those having a cyclic hydrocarbon group(s) such as an aromatic hydrocarbon group(s) or an alicyclic hydrocarbon group(s) can readily lead to the accomplishment of the objects of the invention.

The polyether compound having a cyclic hydrocarbon group(s), which is to be used in the practice of the invention, includes compounds, such as polyoxyethylene and polyoxyethylene-polyoxypropylene copolymers, having a cyclic hydrocarbon group(s) on the side chain(s) and/or in the main chain thereof. The cyclic hydrocarbon group includes, within the meaning thereof, an aromatic hydrocarbon group and/or an alicyclic hydrocarbon group, for example phenyl, naphthyl, cycloalkyl, etc. The term "phenyl" as used herein, unless otherwise indicated, also includes polyvalent cyclic hydrocarbon groups such as "phenylene". Likewise, naphthyl and cycloalkyl groups include, within the meaning thereof, naphthylene and cycloalkylene groups as well.

Among the cyclic hydrocarbon groups, aromatic hydrocarbon groups are preferred in view of their thermal stability and the dispersibility of layered materials.

Among the polyether compounds to be used according to the invention, those having, in the main chain thereof, a unit represented by the general formula (1):

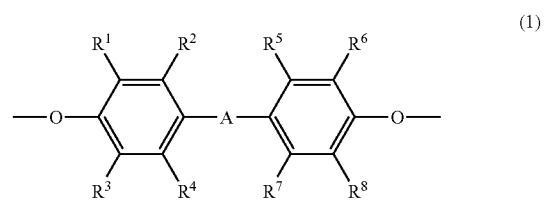

(wherein -A- is —O—, —S—, —SO—, —SO$_2$—, —CO—, an alkylene group containing 1 to 20 carbon atoms or an arylene group containing 6 to 20 carbon atoms and $R^1$, $R^2$, $R^3$, $R^4$, $R^5$, $R^6$, $R^7$ and $R^8$ may be the same or different and each represents a hydrogen atom, a halogen atom or a univalent hydrocarbon group containing 1 to 5 carbon atoms) can preferably be used in view of their thermal stability and the dispersibility of layered materials.

Among them, those represented by the general formula (2):

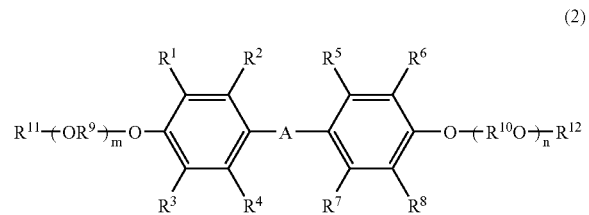

(wherein -A- is —O—, —S—, —SO—, —SO$_2$—, —CO—, an alkylene group containing 1 to 20 carbon atoms or an arylene group containing 6 to 20 carbon atoms, $R^1$, $R^2$, $R^3$, $R^4$, $R^5$, $R^6$, $R^7$ and $R^8$ each represents a hydrogen atom, a halogen atom or a univalent hydrocarbon group containing 1 to 5 carbon atom, $R^9$ and $R^{10}$ each represents a bivalent hydrocarbon group containing 1 to 5 carbon atoms, $R^{11}$ and $R^{12}$ each represents a hydrogen atom or a univalent hydrocarbon group containing 1 to 20 carbon atoms, those may respectively be the same or different, and m and n each represents the number of occurrences of the repeating oxyalkylene group provided that $2 \leq m+n \leq 50$) are preferred in view of the dispersibility of layered materials and their thermal stability.

When the polyether compound to be used in accordance with the invention has a hydroxyl value of not more than 30 mg KOH/g, preferably not more than 28 mg KOH/g, more preferably not more than 25 mg KOH/g, still more preferably not more than 23 mg KOH/g, still further more preferably not more than 20 mg KOH/g, the objects of the invention can readily be accomplished. A hydroxyl value not more than 30 mg KOH/g is preferred from the viewpoint of the thermal stability of resin compositions. When the hydroxyl value is more than 30 mg KOH/g, the molecular weight of the thermoplastic polyester resins tends to decrease and, as a result, the strength and toughness of the polyester resin compositions tend to decrease.

The method of hydroxyl value determination is not particularly restricted but any arbitrary method can be employed. Thus, for example, one gram of the polyether compound to be used in the practice of the invention is acetylated with acetyl chloride, acetic anhydride or glacial acetic acid, for instance. The acetylation product is then hydrolyzed, namely saponified, with an alkaline compound such as sodium hydroxide. The number of milligrams of potassium hydroxide required to neutralize the resulting acetic acid is the hydroxyl value in question.

The polyether compound is used in an amount sufficient to increase the affinity of the layered material for the thermoplastic polyester resin and the dispersibility of the layered material in the polyester resin composition to a satisfactory extent. If necessary, a plurality of polyether compounds having different functional groups may be used in combination. Therefore, the addition amount of the polyether compound is not absolutely restricted numerically. Generally, however, the lower limit to the addition amount of the polyether compound to 100 parts by weight of the layered material is placed at 0.1 part by weight, preferably 0.2 part by weight, more preferably 0.3 part by weight, still more preferably 0.4 part by weight, still further more preferably 0.5 part by weight. The upper limit to the addition amount of the polyether compound to 100 parts by weight of the layered material is 200 parts by weight, preferably 180 parts by weight, more preferably 160 parts by weight, still more preferably 140 parts by weight, still further more preferably 120 parts by weight. When the polyether compound is used in an amount lower than the lower limit (0.1 part by weight), the finely dispersing effect on the layered material tends to become insufficient. Even when the polyether compound is used in an amount exceeding 200 parts by weight, no extra is produced, hence it is not necessary to use more than 200 parts by weight of the compound.

The method of blending the layered material with the polyether compound is not particularly restricted but mention may be made of the method comprising blending the layered material directly with the polyether compound or the method comprising blending the layered material with the polyether compound in water or a polar solvent containing water. The latter is preferred in view of the efficiency of blending. The method of treating the layered material with the polyether compound in the practice of the invention is not particularly restricted but, for example, the method mentioned below may be employed.

First, the layered material is mixed with a dispersion medium with stirring. The dispersion medium includes water and a polar solvent containing water. Specific examples have already been mentioned hereinabove and, therefore, they are not repeated here.

The method of stirring the layered material and the dispersion medium is not particularly restricted but, for example, a wet type stirrer known in the art may be used. The wet type stirrer includes, among others, high speed stirrers in which a stirring blade is rotated at a high speed for effecting stirring, wet mills for wet grinding a sample through the gap between a rotor and stator under a high shear rate, mechanical wet grinders utilizing a hard medium, wet impact grinders in which a sample is caused to collide with a body by means of a jet nozzle or the like, and wet ultrasonic grinders which uses ultrasonic waves. For attaining more efficient blending, the number of stirrer revolutions is increased to not less than 1000 rpm, preferably not less than 1500 rpm, more preferably not less than 2000 rpm, or a shear rate of not less than 500 (1/s), preferably not less than 1000 (1/s), more preferably not less than 1500 (1/s), is applied. The upper limit to the number of revolutions is about 25000 rpm and the upper limit to the shear rate is about 500000 (1/s). Even if stirring is carried out or a shear rate is applied at a level higher than the upper limit, the effect does not tend to increase, hence it is not necessary to effect stirring at a level higher than the upper limit. The time required for blending is 1 to 10 minutes or longer. Then, the polyether compound is added, and the stirring is further continued under the same conditions until sufficient blending is attained. As for the temperature in the step of blending, room temperature is sufficient but warming may be made where necessary. The highest temperature on the occasion of warming should be lower than the decomposition temperature of the polyether compound, and the warming temperature can be selected arbitrarily at a level lower than the boiling point of the dispersion medium. Thereafter, drying is performed, if necessary followed by pulverizing.

The lower limit to the addition amount of the polyether compound-treated layered material per 100 parts by weight of the thermoplastic polyester resin in the polyester resin composition of the invention is typically placed at 0.1 part by weight, preferably 0.3 part by weight, more preferably 0.5 part by weight, still more preferably 1.0 part by weight, still further more preferably 1.5 parts by weight. The upper limit to the addition amount is typically placed at 150 parts by weight, preferably 100 parts by weight, more preferably 70 parts by weight, still more preferably 50 parts by weight, still further more preferably 30 parts by weight. When the addition amount of the layered material is less than the lower limit (0.1 part by weight), the mechanical characteristics improving and warpage reducing effects may be insufficient in certain instances. At an amount above the upper limit (150 parts by weight), the surface appearance of moldings tends to be impaired.

The lower limit to the ash content in the polyester resin composition as resulting from the addition of the layered material is typically 0.1% by weight, preferably 0.3% by weight, more preferably 0.5% by weight, still more preferably 1.0%, still further more preferably 1.5% by weight, and the upper limit to the ash content is typically placed at 60% by weight, preferably 50% by weight, more preferably 40% by weight, still more preferably 30% by weight. At an ash content below the lower limit (0.1% by weight), the mechanical characteristics improving and warpage reducing effects may be insufficient in some instances and, at above the upper limit (60% by weight), the surface appearance of moldings tends to be impaired.

The structure of the layered material dispersed in the polyester resin composition of the invention is quite different from that aggregated structure of μm order in size having a number of superposed layers which the layered material before use has. Thus, upon treatment with the polyether compound, the layers are exfoliated by one another and finely divided independently. As a result, the layered material is dispersed, in the form of very fine, thin platelets independently of one another, in the polyester resin composition. The number of the dispersed platelets is much larger as compared with the layered material before use. Such state of dispersion of the thin plate-like layered material can be expressed in terms of the equivalent area circle diameter [D], aspect ratio (layer length/layer thickness ratio), number of dispersed particles, maximum layer thickness and mean layer thickness mentioned below.

First, the equivalent area circle diameter [D] is defined as the diameter of a circle equivalent in area to each layered material dispersed in varied form on a photomicrograph. In that case, among the layered materials dispersed in the polyester resin composition, the percentage of the number of those layered materials which have an equivalent area circle diameter [D] of not larger than 3000 angstroms is not less than 20%, preferably not less than 35%, more preferably not less than 50%, most preferably not less than 65%. If the proportion of those compounds having an equivalent area circle diameter [D] of not more than 3000 angstroms is less than 20%, the effects of improving the mechanical characteristics of the polyester resin composition and reducing the warpage may be unsatisfactory in some instances. The mean value of equivalent area circle diameters [D] of the layered materials in the polyester resin composition of the invention is not more than 5000 angstroms, preferably not more than 4500 angstroms, more preferably not more than 4000 angstroms, still more preferably not more than 3500 angstroms. When the mean value of equivalent area circle diameter [D] is larger than 5000 angstroms, the effects of improving the mechanical characteristics of the polyester resin composition may become insufficient and/or the surface appearance may be impaired in certain instances. No particular lower limit is placed. At less than 100 angstroms, however, no substantial difference is observed in its effects, hence it is not necessary to reduce the diameter in question to below 100 angstroms.

For the measurement of equivalent area circle diameters [D], an arbitrary region including not less than 100 layered material platelets is selected on a photomicrograph, for instance, and the platelet images are processed using an image processor or the like, followed by computer processing, whereby they can be quantitated.

When the mean aspect ratio is defined as the number average layer length/layer thickness ratio value of the layered material dispersed in the resin, the layered material in the polyester resin composition of the invention has a mean aspect ratio of 10 to 300, preferably 15 to 300, more preferably 20 to 300. If the mean aspect ratio of the layered material is less than 10, the effects of improving the mechanical characteristics of the polyester resin composition of the invention may not be produced to a satisfactory extent in some instances. When it is more than 300, no substantial extra effects are produced, hence a mean aspect ratio higher than 300 is not necessary.

When the value [N] is defined as the number of dispersed particles per unit weight proportion of the layered material as occurring in an area of 100 $\mu m^2$ of the polyester resin composition, the [N] value of the layered material in the polyester resin composition of the invention is not less than 30, preferably not less than 45, more preferably not less than 60. Although there is no upper limit value, no substantial extra effects are producible at an [N] value exceeding about 1000, hence it is not necessary for that value to be larger than 1000. When the [N] value is less than 30, satisfactory improving effects with respect to the mechanical characteristics and warpage of the polyester resin composition may not be produced in some instances. The [N] value can be determined, for example, in the following manner. Thus, an ultrathin section with a thickness of about 50 to 100 $\mu m$ is sliced from the polyester resin composition and photographed using a TEM or the like, and the number of particles of the layered material as occurring in an arbitrary region of 100 $\mu m^2$ in area on the photomicrograph is determined. The [N] value can be obtained by dividing that number by the weight proportion of the layered material used. Alternatively, an arbitrary region (the area thereof is measured) in which not less than 100 particles occur is selected on an photo taken by means of a TEM and the number of the particles occurring there is determined and divided by the weight proportion of the layered material used, and the value obtained is converted to the value corresponding to the area of 100 $\mu m^2$. This value may also be employed as the [N] value. Thus, the [N] value can be quantitated by using, for example, a TEM photo of the polyester resin composition.

When the mean layer thickness is defined as the number average layer thickness value of the layered material dispersed in the form of thin platelets, the upper limit to the mean layer thickness of the layered material in the polyester resin composition of the invention is not more than 500 angstroms, preferably not more than 450 angstroms, more preferably not more than 400 angstroms. When the mean layer thickness is more than 500 angstroms, the effects of improving the mechanical characteristics and other properties of the polyester resin composition of the invention may not be produced to a satisfactory extent in some instances. The lower limit to the mean layer thickness is not particularly restricted but preferably is not less than 50 angstroms, more preferably not less than 60 angstroms, still more preferably not less than 70 angstroms.

When the maximum layer thickness is defined as the maximum value among the values of thickness of thin platelet forms of the layered material dispersed in the polyester resin composition of the invention, the upper limit to the maximum layer thickness of the layered material is not more than 2000 angstroms, preferably not more than 1800 angstroms, more preferably not more than 1500 angstroms. When the maximum layer thickness is more than 2000 angstroms, the balance between the mechanical characteristics and surface appearance of the polyester resin composition of the invention may be impaired in some instances. The lower limit to the maximum layer thickness of the layered material is not particularly restricted but is preferably not less than 100 angstroms, more preferably not less than 150 angstroms, still more preferably not less than 200 angstroms.

The layer thickness and layer length can be determined from a photograph, taken by using a microscope or the like, of a film obtained by heating and melting the polyester resin composition of the invention and then hot press molding or draw forming the molten resin or of a thin-wall molding product obtained by injection molding of the molten resin.

Now, it is supposed that an injection-molded thin flat specimen about 0.5 to 2 mm in thickness as prepared in the above manner is placed on an X-Y plane. A section about 50 to 100 $\mu m$ in thickness is sliced from the film along a plane parallel to the X-Z or Y-Z plane and the section is observed under a transmission electron microscope, for instance, under a high degree of magnification such as about 40 thousand to 100 thousand times or higher. For the measurements, an arbitrary region including not less than 100 of the layered material is selected on a photomicrograph taken by means of a transmission electron microscope as obtained in the above manner and the region is subjected to image processing by means of an image processor or the like and further to computer processing for quantitation. It is also possible to measure them using a ruler or the like.

When a phosphorus-containing compound and/or an epoxy compound is incorporated in the composition of the invention, the objects of the invention can readily be accomplished.

As the phosphorus-containing compound, there may be mentioned phosphorus-containing stabilizers and/or phosphorus-containing flame retardants.

The phosphorus-containing stabilizers are not particularly restricted but include those phosphorus-containing stabilizers in common use, typically phosphite stabilizers.

As specific examples of the phosphite stabilizers, there may be mentioned tris(phenyl) phosphite, dibutyl hydrogen phosphite, tris(octylphenyl) phosphite, tris(nonylphenyl) phosphate, tris(decyl) phosphite, tris(dodecyl) phosphite, tris(tetradecyl) phosphite, tris(stearyl) phosphite, bis(phenyl) octyl phosphite, bis(phenyl) decyl phosphite, bis(phenyl) dodecyl phosphite, bis(phenyl tetradecyl phosphite, bis(octyl) phenyl phosphite, bis(decyl) phenyl phosphite, bis(dodecyl) phenyl phosphite, bis(tetradecyl) phenyl phosphite, bis(stearyl) phenyl phosphite, tetra(octyl) bisphenol A diphosphite, tetra(decyl) bisphenol A diphosphite, tetra (dodecyl) bisphenol A diphosphite, tetra(stearyl) bisphenol A diphosphite, tris(mono, dioctylphenyl) phosphite, tris (mono, dinonylphenyl) phosphite, tris(mono, didodecylphenyl) phosphite, tris(2,4-di-t-butylphenyl) phosphite, 2,2-methylenebis(4,6-di-t-butylphenyl) octyl phosphite, 2,2-methylenebis(4,6-di-t-butylphenyl)decyl phosphite, 2,2-methylenebis( 4,6-di-t-butylphenyl)dodecyl phosphite, 2,2-methylenebis(4,6-di-t-butylphenyl)tetradecyl phosphite, bis (2,6-di-t-butyl-4-methylphenyl)pentaerythritol diphosphite, bis(2,6-di-t-butyl-4-ethylphenyl)pentaerythritol diphosphite, bis(2,6-di-t-butyl-4-octylphenyl)pentaerythritol diphosphite, bis(2,6-di-t-butyl-4-decylphenyl)pentaerythritol diphosphite, bis(2,6-di-t-butyl-4-dodecylphenyl)pentaerythritol diphosphite, bis(2,4,6-tri-t-butylphenyl) pentaerythritol diphopshite, bis(2,4-di-t-butylphenyl) pentaerythritol diphosphite, bis(stearyl) pentaerythritol diphosphite, bis(octylphenyl) pentaerythritol diphosphite, bis(nonylphenyl) pentaerythritol diphosphite, bis(decylphenyl) pentaerythritol diphosphite, bis(dodecylphenyl) pentaerythritol diphosphite, bis(tetradecylphenyl) pentaerythritol diphosphite and the like. Preferred in view of the thermal stabilizing effect and ready availability are tris(phenyl) phosphite, bis(nonylphenyl) pentaerythritol diphosphite, bis (stearyl) pentaerythritol diphosphite, bis(2,4-di-t-butylphenyl) pentaerythritol diphosphite, bis(2,6-di-t-butyl-4-methylphenyl) pentaerythritol diphosphite, 2,2-methylenebis(4,6-di-t-butylphenyl) octyl phosphite, tris(mono, dinonylphenyl) phosphite, tetra(dodecyl) bisphenol A diphosphite, bis(phenyl) octyl phosphite, bis(phenyl) decyl phosphite, bis(decyl) phenyl phosphite and tris(decyl) phosphite.

In the polyester resin composition of the invention, the lower limit to the addition amount of the above phosphorus-containing stabilizer per 100 parts by weight of the thermoplastic resin is 0.001 part by weight, preferably 0.01 part by weight, more preferably 0.05 part by weight, still more preferably 0.1 part by weight. The upper limit is 10 parts by weight , preferably 5 parts by weight, more preferably 2 parts by weight, still more preferably 1 part by weight. When the lower limit is placed at less than 0.001 part by weight, the thermal stabilization effect can hardly be produced and, when the upper limit is placed at above 10 parts by weight, the mechanical characteristics may be impaired in certain instances.

The phosphorus-containing flame retardants to be used in the practice of the invention are not particularly restricted but include those phosphorus-containing flame retardants in general use, typically phosphate compounds, phosphonate compounds, phosphinate compounds, phosphine oxide compounds, phosphonite compound, phosphine compounds and other organophosphorus compounds as well as red phosphorus and like materials.

As specific examples of the organophosphorus compounds, there may be mentioned trimethyl phosphate, triethyl phosphate, tributyl phosphate, tri(2-ethylhexyl) phosphate, tributoxyethyl phosphate, triphenyl phosphate, tricresyl phosphate, trixylenyl phosphate, tris(isopropylphenyl) phosphate, tris(phenylphenyl) phosphate, trinaphthyl phosphate, cresyl diphenyl phosphate, xylenyl diphenyl phosphate, diphenyl (2-ethylhexyl) phosphate, di(isopropylphenyl) phenyl phosphate, monoisodecyl phosphate, 2-acryloyloxyethyl acid phosphate, 2-methacryloyloxyethyl acid phosphate, diphenyl 2-acryloyloxyethyl phosphate, diphenyl 2-methacryloyloxyethyl phosphate, melamine phosphate, dimelamine phosphate, melamine pyrophosphate, triphenylphosphine oxide, tricresylphosphine oxide, diphenyl methanephosphonate, diethyl phenylphosphonate and the like as well as condensed phosphate ester compounds represented by the general formula (6):

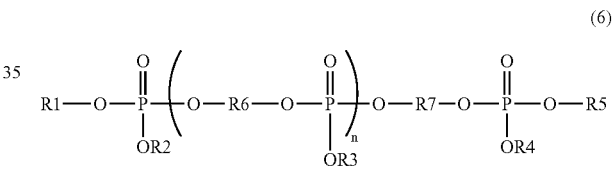

(6)

(wherein R1 to R5 each represents a univalent aromatic or aliphatic group, R6 and R7 each represents a bivalent aromatic group, n represents 0 to 15 and the n of R3 groups and the n of R6 groups may be the same or different, respectively.).

As specific examples of the above condensed phosphate esters, there may be mentioned resorcinol polyphenyl phosphate represented by the formula (7) shown below, resorcinol poly(di-2,6-xylyl)phosphate represented by the formula (8), bisphenol A polycresyl phosphate represented by the formula (9) and hydroquinone poly(2,6-xylyl) phosphate represented by the formula (10) and condensation products derived from these.

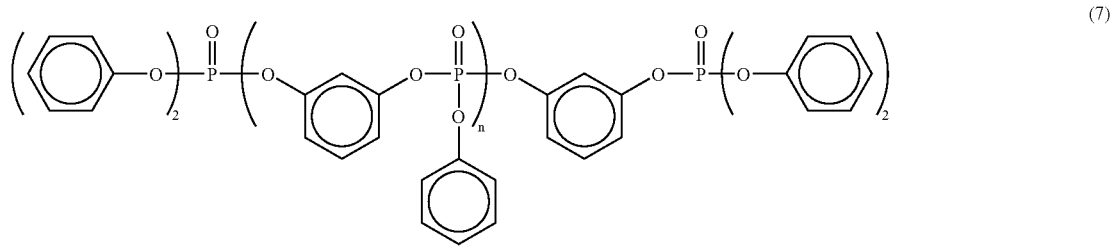

(7)

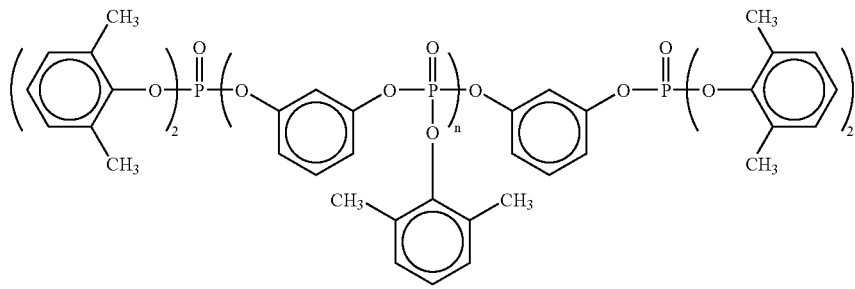

(8)

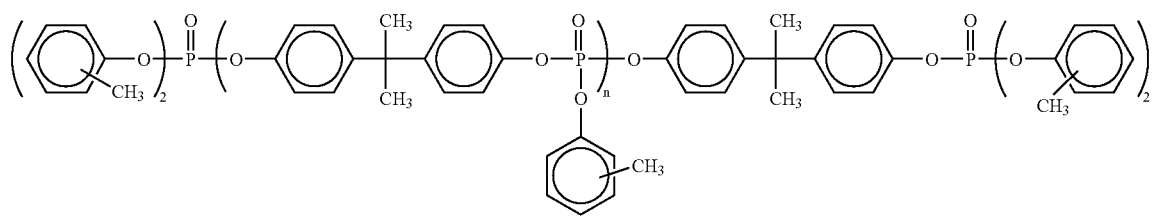

(9)

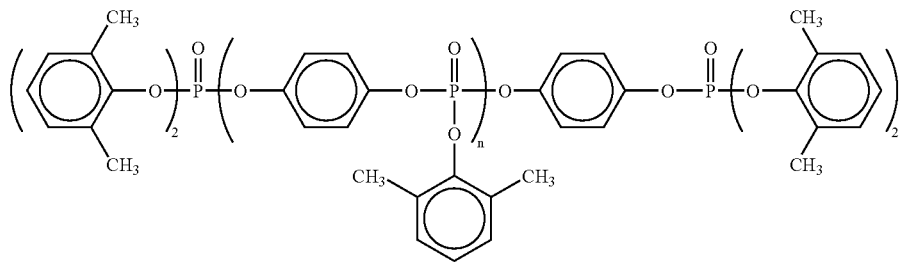

(10)

In the above formulas (7) to (10), n is 0 to 15.

Suited for use as the red phosphorus compounds in the practice of the invention are not only untreated red phosphorus but also compounds derived from red phosphorus by treatment with one or more coating compounds selected from the group consisting of thermosetting coating resins, coating metal hydroxides and plating metals.

The thermosetting resins for coating are not particularly restricted provided that red phosphorus can be coated therewith. Thus, there may be mentioned, among others, phenol-formalin resins, urea-formalin resins, melamine-formalin resins and alkyd resins. The metal hydroxides for coating are not particularly restricted provided that red phosphorus can be coated therewith; thus, mention may be made of aluminum hydroxide, magnesium hydroxide, zinc hydroxide and titanium hydroxide, among others. The metals for plating are not particularly restricted provided that red phosphorus can be coated therewith; thus, there may be mentioned, among others, Fe, Ni, Co, Cu, Zn, Mn, Ti, Zr, Al and alloys of these. Further, the coating may be composed of two or more compounds or may be a laminate composed of two or more compounds.

The phosphorus-containing flame retardants mentioned above may be used singly or two or more of them may be used in combination.

As preferred examples of the above phosphorus-containing flame retardants, there may be mentioned phosphate compounds, phosphonate compounds, phosphinate compounds and like phosphate ester compounds and red phosphorus compounds.

In the flame-retardant polyester resin composition of the invention, the lower limit to the addition amount of the phosphorus-containing flame retardant as expressed in terms of phosphorus content is 0.01 part by weight, preferably 0.05 part by weight, more preferably 0.1 part by weight, still more preferably 0.2 part by weight, still further more preferably 0.5 part by weight, per 100 parts by weight of the thermoplastic polyester resin. The upper limit, when expressed in terms of phosphorus content, is 15 parts by weight, preferably 10 parts by weight, more preferably 8 parts by weight, still more preferably 5 parts by weight. At an addition amount lower than 0.01 part by weight, the flame retardant effect can hardly be produced while at a level higher than 15 parts by weight, the mechanical characteristics may be impaired in certain instances.

The epoxy compound to be used in the practice of the invention is not particularly restricted but includes bisphenol A-based epoxy resins synthesized by reacting bisphenol A with epichlorohydrin or the like, bisphenol F-based epoxy resins synthesized by a similar reaction, novolak type epoxy resins synthesized by reacting a novolak resin with epichlorohydrin or the like, glycidyl ether compounds synthesized by reacting a polyhydric aliphatic, alicyclic or aromatic alcohol with epichlorohydrin, epoxy compounds obtained by epoxidizing an aliphatic or alicyclic compound having a plurality of unsaturated groups with acetic acid and peracetic acid, glycidylamine compounds synthesized by reacting an aliphatic, alicyclic or aromatic polyamine with epichlorohydrin, epoxy compounds synthesized by reacting a compound having a plurality of nitrogen-containing hetero rings with epichlorohydrin, and so forth.

From the heat resistance effect viewpoint, it is desirable that the epoxy compound to be used in the practice of the invention contain two or more epoxy groups in each molecule and that it contain no ester bond in the molecule.

As specific examples of the above epoxy compound, there may be mentioned, among others, Epikote 828, Epikote 1001, Epikote 152 (all trademarks; products of Yuka Shell Epoxy) and like epoxy resins, Denacol EM-125, Denacol EX-1101, Denacol EX-1102, Denacol EX-1103 (all trademarks; products of Nagase Kasei Kogyo) and like epoxy emulsions, alkylene glycol diglycidyl ether compounds such as ethylene glycol diglycidyl ether, propylene glycol diglycidyl ether, tetramethylene glycol diglycidyl ether, neopentyl glycol diglycidyl ether and 1,6-hexanediol diglycidyl ether, polyalkylene glycol diglycidyl ether compounds such as polyethylene glycol diglycidyl ether, polypropylene glycol diglycidyl ether, polybutanediol diglycidyl ether, polyneopentyl glycol diglycidyl ether and polytetramethylene glycol diglycidyl ether, resorcin diglycidyl ether, erythrit polyglycidyl ether, trimethylolpropane polyglycidyl ether, pentaerythritol polyglycidyl ether, hydroquinone diglycidyl ether, diglycerol polyglycidyl ether, polyglycerol polyglycidyl ether, sorbitan polyglycidyl ether, sorbitol polyglycidyl ether, bisphenol S diglycidyl ether, diglycidylamine, tetraglycidyl-4,4'-diaminodiphenylmethane, diglycidylaniline, triglycidyltris(2-hydroxyethyl) isocyanurate and so forth. These may be used singly or two or more of them may be used in combination.

The above epoxy compounds preferably have an epoxy equivalent of not more than 700, more preferably not more than 500, still more preferably not more than 300. When the epoxy equivalent exceeds 700, poor wet heat resistance may result.

In the polyester resin composition of the invention, the lower limit to the addition amount of the epoxy compound is 0.01 part by weight, preferably 0.05 part by weight, more preferably 0.1 part by weight, still more preferably 0.3 part by weight, per 100 parts by weight of the thermoplastic polyester resin, while the upper limit is 30 parts by weight, preferably 20 parts by weight, more preferably 10 parts by weight, still more preferably 5 parts by weight. When the lower limit to the addition amount is placed at below 0.01 part by weight, the thermal stabilization effect can hardly be produced and, when the upper limit is above 30 parts by weight, the mechanical characteristics and the surface appearance of the moldings may be impaired in some instances.

The method of producing the polyester resin composition of the invention is not particularly restricted but may be, for example, the one which comprises melting and kneading the thermoplastic polyester resin and the polyether compound-treated layered material, optionally together with the phosphorus-containing compound and/or epoxy compound, using any of various kneaders in general use. As examples of the kneader, there may be mentioned single-screw kneaders, twin-screw kneaders, rolls, Banbury mixers, kneaders and the like. In particular, kneaders of high shearing efficiency are preferred. Working type twin-screw extruders having kneading disk portions are particularly preferred from the layered material dispersibility viewpoint. The order of kneading is not particularly restricted. Thus, the thermoplastic polyester resin and the polyether-treated layered material, if necessary together with the phosphorus-containing compound and/or epoxy compound, may be charged into the kneader all at once for melting and kneading, or the thermoplastic polyester resin and layered material are kneaded together and then the phosphorus-containing compound and/or epoxy compound may be added thereto for kneading, or the layered material, if necessary together with the phosphorus-containing compound and/or epoxy compound, may be added to the thermoplastic polyester resin in a molten state brought about in advance, for kneading.

When, in producing the polyester resin composition, a step is taken of increasing the molecular weight of the polyester resin following melting and kneading, the objects of the invention can readily be accomplished.

The composition obtained by the above melting and kneading mainly comprises the thermoplastic polyester resin, the finely dispersed layered material and the polyether compound. While the finely dispersed layered material contained therein improves the mechanical characteristics and warpage of the resin without adversely affecting the surface appearance, the thermal stability in melting and processing, when the polyether compound is still contained in the composition, cannot always be said to be fully satisfactory and, in particular when the composition is detained in the molten form, the mechanical characteristics may unfavorably deteriorate in certain instances as a result of the decrease in molecular weight of the resin. For preventing such cases, a procedure for increasing the molecular weight is preferably carried out following melting and kneading.

The molecular weight increasing procedure is not particularly restricted but a method of polymerization for thermoplastic polyester resins which is in general use can be used. As such method, there may be mentioned, for example, the method comprising the composition obtained by melting and kneading is charged as such into a polymerizer and reducing the pressure of the system while stirring in the molten state to thereby effect melt polycondensation, or the method comprising cooling and palletizing the melt-kneaded composition and, after preliminary crystallization and drying, heating the pellets to a temperature of 150° C. to the melting point to thereby effect solid phase polymerization. The method comprising effecting melt polycondensation by heating under reduced pressure is preferred, however. The pressure in that case is preferably 0.01 Mpa to 1.2 Mpa, more preferably 0.01 Mpa to 0.7 Mpa. As for the temperature, the range from the melting point to 350° C. is preferred and the range from the melting point to 320° C. is more preferred. By maintaining such conditions for about 0.2 to 5 hours, for instance, depending on the structure of the polymerizer and the sort of the stirring apparatus, the intended molecular weight increase can be accomplished.

The polymerization catalyst necessary for increasing the molecular weight of the resin is already contained in the raw material thermoplastic polyester resin. If necessary, however, one or more of metal oxides, carbonate salts, acetate salts, alcoholates and the like may be added anew. As an alternative method, in cases where the screw constitution, cylinder length, deaeration equipment and other structural features of the kneader to be used in the above-mentioned melt-kneading step and the kneading temperature, retention time and other kneading conditions are suited for increasing the molecular weight of the thermoplastic polyester resin, it is also possible to realize the molecular weight increasing process in the kneader. This method is preferred since the polyester resin composition can be prepared more efficiently and since one or more of various additive materials such as pigments, dyes, heat stabilizers, antioxidants, ultraviolet absorbers, light stabilizers, lubricants, plasticizers, flame retardants and antistatic agents can be added, hence the production process can be simplified.

In the polyester resin composition of the invention, there may be incorporated, if necessary, an impact resistance improver selected from among polybutadiene, butadiene-styrene copolymers, acrylic rubbers, ionomers, ethylene-propylene copolymers, ethylene-propylene-diene copolymers, natural rubbers, chlorinated butyl rubbers, α-olefin homopolymers, copolymers of two or more α-olefins (inclusive of random, block, graft and other copolymers as well as mixtures of these), olefinic elastomers and the like as well as modification of these as modified with an acid compound such as maleic anhydride. Unless the mechanical characteristics, thermal stability and other characteristics are impaired, one or more of other arbitrary resins, such as unsaturated polyester resins, polyester carbonate resins, liquid crystal polyester resins, polyolefin resins, polyamide resins, rubber-like polymer-reinforced styrenic resins, polyphenylene sulfide resins, polyphenylene ether resins, polyacetal resins, polysulfone resins and polyarylate resins, may be used in combination with the thermoplastic polyester resin.

To the polyester resin composition of the invention, one or more of additives, such as pigments or dyes, ultraviolet absorbers, light stabilizers, lubricants, plasticizers, flame retardants and antistatic agents, may further be added according to the purposes or requirements.

The polyester resin composition of the invention can be subjected to injection molding, thermal press molding or blow molding.

The polyester resin composition of the invention can be molded by various molding methods into various forms, for example various moldings, platelets, pipes, bottles and the like. The polyester resin composition of the invention is excellent in flame retardancy, fluidity in molding, appearance, mechanical characteristics and heat resistance and therefore suited for use, for example, as automotive parts, household electric appliance parts, precision machine parts, household daily necessities, packaging and container materials, magnetic recoding medium substrates, and other industrial materials for general use.

BEST MODES FOR CARRYING OUT THE INVENTION

The following examples illustrate the present invention in more detail. They are, however, by no means limitative of the scope of the invention.

The key materials used in the examples and comparative examples are summarized below. Unless otherwise indicated, the materials were used without purification.

(Raw Materials)

Thermoplastic polyester resins: Polyethylene terephthalate resin (Kanebo's Bellpet EFG 85A, logarithmic viscosity number ($\eta_{inh}$)=0.85 (dl/g); hereinafter referred to as PET) and polybutylene terephthalate (KOLON's KP 210; hereinafter referred to as PBT) were used.

Layered materials: Montmorillonite (Kunimine Kogyo's Kunipia F; hereinafter referred to as Kunipia F) and swellable mica (Coop Chemical's Somasif ME 100; hereinafter referred to as Somasif ME 100) were used.

Polyether compounds: Blenmer ADE 400, Blenmer PDT 800, Uniox MM 500 (products of NOFCO) as well as PEG 400, PEG 4000S and NC-3 (products of Sanyo Chemical Industries) were used. The structures, hydroxyl values and solubilities in water of the polyether compounds used in the practice of the invention are shown in Table 1.

TABLE 1

| Trade name | Structure | Hydroxyl value mgKOH/g | Solubility in water (*1) g |
|---|---|---|---|
| Blenmer ADE400 | Polyethylene glycol diacrylate | ~0 | ≧100 |
| Uniox MM500 | Polyethylene glycol dimethyl ether | 2.8 | ≧100 |
| NC-3 | Polyethylene glycol allyl methyl ether | 7.4 | ≧100 |
| PEG4000S | Polyethylene glycol, mol wt ca 4000 | 34.5 | ≧100 |
| PEG400 | Polyethylene glycol, mol wt ca 400 | 275 | ≧100 |
| Blenmer PDT800 | Polytetramethylene glycol dimethacrylate | ~0 | ≦1 |

(*1) The amount causing phase separation upon mixing with 100 g of deionized water was determined by visual observation.

Further used were polyethylene glycols containing a bisphenol A unit in the main chain (Toho Chemical's Bisol 18EN and Bisol 10EN) and polyethylene glycols (Sanyo Chemical's PEG 400 and PEG 1000).

Glass fiber: Nippon Electric Glass' T-195H (hereinafter referred to as GF) was used.

Phosphorus-containing stabilizers: Bis(2,6-di-t-butyl-4-methylphenyl) pentaerythritol diphosphite (Asahi Denka's Adekastab PEP36; hereinafter referred to as stabilizer C-1), 2,2'-methylenebis(4,6-di-t-butylphenyl) octyl phosphite (Asahi Denka's Adekastab HP10; hereinafter referred to as stabilizer C-2) and bis(2,4-di-t-butylphenyl) pentaerythritol diphosphite (Asahi Denka's Adekastab 2112; hereinafter referred to as stabilizer C-3) were used.

Phosphorus-containing flame retardands: Phenol resin-coated red phosphorus (Rin Kagaku Kogyo's Novaexcel 140; hereinafter referred to as flame retardant F-1) (mean particle diameter 25 to 35 μm), bisphenol A bis(dicresyl) phosphate (Daihachi Kagaku's CR747; hereinafter referred to as flame retardant F-2), resorcinol bis(di-2,6-xylyl) phosphate (Daihachi Kagaku's PX200; hereinafter referred to as flame retardant F-3) and melamine pyrophosphate (Buddenehim's BUDIT 311; hereinafter referred to as flame retardant F-4) were used.

Melamine-cyanuric acid adduct: Nissan Chemical's MC440 (hereinafter referred to as MC440) was used.

Epoxy compounds: Bisphenol A-based epoxy resin (Yuka Shell Epoxy's Epikote 828; hereinafter referred to as epoxy compound D-1) and o-cresol novolak-based epoxy resin (Tohto Kasei's Epo Tohto YDCN704P; hereinafter referred to as epoxy compound D-2) were used.

(Hydroxyl Value)

An amount of each polyether compound as specified in Table 1 was accurately weighed and dissolved in acetic anhdyride/pyridine (¼ by weight). After dissolution, the solution was heated at about 98° C. for about 1 hour. Then, a small amount of water was added and the mixture was further heated for 10 minutes to thereby decompose the excess acetic anhydride. After cooling, phenolphthalein was added as an indicator and titration was carried out with N/2 standard aqueous potassium hydroxide solution. That point at which a pale carmine color lasted for 30 seconds was taken as the end point.

In Table 1, "~0" means that the hydroxyl value is nearly 0 (zero).

(Solubility in Water)

A polyether compound was added gradually into 100 g of deionized water with stirring. By visual observation, the amount of the polyether compound which caused phase separation was determined and reported as the solubility.

(Measurements for Dispersion State)

Ultrathin sections having a thickness of 50 to 100 μm were used. The state of dispersion of each layered material was observed and photographed using a transmission electron microscope (JEOL JEM-1200EX) at an acceleration voltage of 80 kV and a magnification of 40 thousand to 1 million times. On each TEM photo, an arbitrary region in which not less than 100 dispersed particles occurred was selected and the layer thickness and length, the number of particles ([N] value) and the equivalent area circle diameter [D] were measured manually using a graded ruler or by picture processing using Interquest's image analyzer PIASIII.

The equivalent area circle diameter [D] was determined by image processing using Interquest's image analyzer PIASIII. The [N] value was determined in the following manner. First, on a TEM photograph, the number of particles of the layered material occurring in a selected area was determined. Separately, the ash content in the resin composition as resulting from the layered material was determined. The number of particles was divided by the ash content and the value was converted to the value per unit area of 100 μm² and this value was reported as the [N] value. The number average value of layer thickness values for each layered material was reported as the mean layer thickness and the maximum value among layer thickness values for each layered material was reported as maximum layer thickness. In cases where the dispersed particles were large and unsuited for observation under a TEM, the [N] value was determined in the same manner as mentioned above using an optical microscope (Olympus Optical's optical microscope BH-2). If necessary, however, the sample was melted at 250 to 270° C. using LINKAM's hot stage THM 600 and the state of particles was observed in the molten stage. For dispersed particles not in the form of platelets, the major axis/minor axis ratio was reported as the aspect ratio. In this context, the major axis is the long side of a circumscribed rectangle in which the target particle is inscribed and which is minimal in area among such circumscribed rectangles, while the minor axis is the short side of that rectangle. The number average value of layer length to layer thickness ratios of each layered material was reported as the mean aspect ratio.

(Bending Characteristics)

As far as Tables 1 to 11 are concerned, each polyester resin composition was dried (140° C., 5 hours). Using an injection molding machine (Toshiba Machine model IS-75E) at a closing pressure of 75 tons, test specimens, about 10×100×6 mm in size, were injection-molded at a resin temperature of 250 to 270° C. The test specimens obtained were measured for flexural strength and flexural modulus according to ASTM D-790.

As far as Tables 12 to 22 are concerned, each polyester resin composition was dried (140° C., 5 hours). Using an injection molding machine at a closing pressure of 80 tons, test specimens, about 6.4 mm in thickness, about 12.7 mm in width and about 127 mm in length, were prepared at a cylinder temperature of 250 to 280° C. The test specimens obtained were measured for bending characteristics according to ASTM D-790.

As regards Tables 23 to 27, each polyester resin composition was dried (140° C., 5 hours). Using an injection molding machine at a closing pressure of 80 tons, test specimens, about 10×100×6 mm in size, were injection-molded at a resin temperature of 250 to 270° C. The test specimens obtained were measured for flexural strength and flexural modulus according to ASTM D-790.

(Thermal Stability in the Molten State)

After 5 minutes or 15 minutes of retention in the cylinder of an injection molding machine at 250 to 270° C., test specimens were prepared under the same conditions as mentioned above and then measured for flexural strength.

(Flow After Retention in the Molten State)

The polyester resin compositions of the invention were dried (140° C., 5 hours). Using a Shimadzu flow tester, the compositions were measured for method B flow values at a temperature of 280° C. (for PET compositions), 270° C. (for PPT compositions) or 260° C. (for PBT compositions) under a load of 100 kg and the changes with retention time were examined. In this test, smaller changes in method B flow are preferred.

(Wet Heat Resistance)

Test specimens of each polyester resin composition of the invention were subjected to 30 hours of treatment under high-temperature and high-humidity conditions in a pressure cooker maintained at 121° C. and 100% RH and then measured for flexural strength according to ASTM D-790.

(Warpage)

Each polyester resin composition of the invention was dried (140° C., 5 hours) and then molded into flat test specimens, about 120×120×1 mm in size, using an injection molding machine at a closing pressure of 80 tons at a mold temperature of 120° C. and a cylinder temperature of 250 to 280° C. Each of the above test specimens was placed on a plane, one of the four corners was held and the longest of the distances of the remaining three corners from the plane was measured using a clearance gage or vernier calipers. The four corners were held one by one and the mean of the four warpage values was calculated. A smaller warpage value reflects better results.

(Surface Gloss)

The flat test specimens molded under the same conditions as in warpage evaluation were measured for surface gloss. Using ERICHSEN's Mini Gloss Master, the gloss was measured at an angle of reflection of 60° and expressed in terms of relative value with the value for a standard platelet being taken as 50%.

(Ash Content)

The ash content in the polyester resin composition as resulting from the layered material was determined according to JIS K 7052.

(Flame Retardancy)

Each flame-retardant polyester resin composition of the invention was dried (140° C., 5 hours) and then molded into test specimens, about 1.6 mm in thickness, about 12.7 mm in width and about 127 mm in length, using an injection molding machine at a closing pressure of 150 tons at a mold temperature of 80° C. and a cylinder temperature of 250 to 280° C.

The above test specimens were evaluated for flame retardancy according the specification UL-94. The result "off-grade" means that the requirements of UL-94 V were not satisfied.

PRODUCTION EXAMPLE 1

Deionized water was blended with the layered material. Then, the polyether compound was added and stirring was continued for 15 to 30 minutes. The mixture was then dried to a powder form. The layered materials (A-1 to A-6 and B-1 to B-3) were thus obtained. The weight proportions of the raw materials used in this production example are shown in Table 2 (in parts by weight).

TABLE 2

|  | A-1 | A-2 | A-3 | A-4 | A-5 | A-6 | B-1 | B-2 | B-3 |
|---|---|---|---|---|---|---|---|---|---|
| Deionized water | 100 | 100 | 100 | 100 | 100 | 100 | 100 | 100 | 100 |
| ME100 | 8 | 8 | 8 | 8 | 8 |  | 8 | 8 |  |
| Kunipia F |  |  |  |  |  | 5 |  |  | 5 |
| MM500 | 5 | 10 |  |  |  | 6 |  |  |  |
| ADE400 |  |  | 5 |  |  |  |  |  |  |
| NC3 |  |  |  | 5 |  |  |  |  |  |
| PDT800 |  |  |  |  | 5 |  |  |  |  |
| PEG400 |  |  |  |  |  |  | 5 |  | 6 |
| PEG4000S |  |  |  |  |  |  |  | 5 |  |

PRODUCTION EXAMPLE 2

A reactor was charged with dimethyl terephthalate (DMT), 76 parts by weight, per 100 parts by weight of DMT, of propylene glycol, 0.003 part by weight of a hindered phenol stabilizer (Asahi Denka's Adekastab A060; hereinafter referred to as A060) and 0.00025 part by weight of Ti(OBu)$_4$ and the transesterification reaction was allowed to proceed between DMT and propylene glycol at a reaction temperature of about 150 to 200° C. with stirring. Thereafter, 0.00025 part by weight of Sb$_2$O$_3$ was added and the polycondensation was carried out in the molten state at a reaction temperature of 270 to 280° C. under reduced pressure (0.8 to 5.0 torr (0.107 to 0.665 MPa)) to give polypropylene terephthalate (PPT).

EXAMPLES 1 TO 7

Polyester resin compositions were prepared by melt-kneading PET, the layered material (A-1 to A-6) obtained in Production Example 1 and A060 in the weight proportions shown in Table 3 in a twin-screw extruder (Japan Steel Works' model TEX44) and evaluated. The results are shown in Table 3.

TABLE 3

|  | Examples | | | | | | |
|---|---|---|---|---|---|---|---|
|  | 1 | 2 | 3 | 4 | 5 | 6 | 7 |
| PET (wt parts) | 100 | 100 | 100 | 100 | 100 | 100 | 100 |
| A-1 (wt parts) | 20 | 50 |  |  |  |  |  |
| A-2 (wt parts) |  |  | 30 |  |  |  |  |
| A-3 (wt parts) |  |  |  | 20 |  |  |  |
| A-4 (wt parts) |  |  |  |  | 20 |  |  |
| A-5 (wt parts) |  |  |  |  |  | 20 |  |
| A-6 (wt parts) |  |  |  |  |  |  | 30 |
| Proportion (%) of particles with [D] ≦ 3000 Å | 58 | 45 | 65 | 50 | 42 | 22 | 51 |
| Mean [D] (Å) | 2380 | 3260 | 2050 | 2970 | 3520 | 4830 | 2940 |
| [N] (particles/wt % · 100 µ$^2$) | 50 | 46 | 57 | 46 | 42 | 31 | 47 |
| Mean aspect ratio | 57 | 37 | 62 | 42 | 36 | 15 | 44 |
| Mean layer thickness (Å) | 280 | 360 | 230 | 320 | 380 | 470 | 310 |
| Maximum layer thickness (Å) | 1280 | 1490 | 1100 | 1560 | 1680 | 1960 | 1550 |
| Ash content (wt %) | 10.1 | 20.3 | 10.1 | 10.2 | 10.2 | 10.3 | 10.6 |
| Flexural modulus (MPa) | 4990 | 6450 | 5100 | 4850 | 4780 | 4570 | 4840 |
| Flexural strength (MPa) | 105 | 112 | 104 | 104 | 102 | 100 | 103 |
| Flexural strength after 5 minutes of retention (MPa) | 100 | 103 | 95 | 99 | 95 | 92 | 90 |
| Warpage (mm) | 3.5 | 2.7 | 3.4 | 3.6 | 4.0 | 4.5 | 3.8 |
| Gloss (%) | 82 | 84 | 83 | 82 | 80 | 78 | 81 |

COMPARATIVE EXAMPLES 1 TO 6

Compositions were prepared by melt-kneading PET, the layered material (B-1 to B-3) obtained in Production Example 1, ME100, Kunipia F, GF and AO60 in the weight proportions given in Table 4 in the same manner as in Example 1 and evaluated. The results are shown in Table 4.

TABLE 4

| | Comparative Examples | | | | | |
|---|---|---|---|---|---|---|
| | 1 | 2 | 3 | 4 | 5 | 6 |
| PET (wt parts) | 100 | 100 | 100 | 100 | 100 | 100 |
| ME100 (wt parts) | 11 | | | | | |
| Kunipia F (wt parts) | | 11 | | | | |
| B-1 (wt parts) | | | 20 | | | |
| B-2 (wt parts) | | | | 20 | | |
| B-3 (wt parts) | | | | | 30 | |
| GF (wt parts) | | | | | | 11 |
| Proportion (%) of particles with [D] ≤ 3000 Å | 0 | 0 | 56 | 43 | 50 | Not measured |
| Mean [D] (Å) | 24200 | 24800 | 2660 | 3490 | 2990 | Not measured |
| [N] (particles/wt % · 100 μ²) | 5 | 4 | 41 | 35 | 45 | Not measured |
| Mean aspect ratio | 1.5 (*1) | 1.5 (*1) | 47 | 38 | 42 | Not measured |
| Mean layer thickness (Å) | ca 3 · 10⁴ (*2) | ca 3 · 10⁴ (*2) | 300 | 380 | 320 | Not measured |
| Maximum layer thickness (Å) | ca 9 · 10⁵ (*3) | ca 9 · 10⁵ (*3) | 1240 | 1450 | 1560 | Not measured |
| Ash content (wt %) | 10.3 | 10.0 | 10.1 | 10.2 | 10.2 | 10.3 |
| Flexural modulus (MPa) | 3660 | 3540 | 4560 | 4510 | 4430 | 5350 |
| Flexural strength (MPa) | 116 | 114 | 104 | 102 | 100 | 122 |
| Flexural strength after 5 minutes of retention (MPa) | 113 | 103 | Unmoldable (*4) | Unmoldable (*4) | Unmoldable (*4) | 115 |
| Warpage (mm) | Nonmeasurable (*5) | Nonmeasurable (*5) | 3.5 | 3.8 | 4.0 | 16.2 |
| Gloss (%) | Nonmeasurable (*5) | Nonmeasurable (*5) | 80 | 79 | 79 | 51 |

(*1) Since dispersion in platelet form was unattainable, the major axis/minor axis ratio of dispersed particles was taken.
(*2) Since dispersion in platelet form was unattainable, the number average minor axis of dispersed particles was taken.
(*3) Since dispersion in platelet form was unattainable, the maximum minor axis of dispersed particles was taken.
(*4) Unmoldable since the retention resulted in a marked decrease in viscosity.
(*5) Nonmeasurable since the molded product showed marked deformation.

As is seen from Table 4, ME 100 or Kunipia F, without polyether treatment, failed to finely disperse in the form of thin platelets, hence failed to improve the flexural characteristics or give good flat test specimens. When the treatment was carried out with a polyether compound (PEG 400, PEG 4000S) having a hydroxyl value higher than 30 mg KOH/g (B-1 to B-3), very poor thermal stability resulted, for example the flexural strength markedly decreased upon retention in molten state or the viscosity excessively lowered, making molding almost impossible, although the flexural characteristics were improved. GF impaired the warpage and/or gloss features. Thus, in the comparative examples, no well-balanced moldings could be obtained.

EXAMPLES 8 AND 9

Polyester resin compositions were prepared by melt-kneading PBT, the layered material (A-1, A-3) obtained in Production Example 1 and AO60 in the weight proportions specified in Table 5 in the same manner as in Example 1 and evaluated. The results are shown in Table 5.

COMPARATIVE EXAMPLES 7 AND 8

Polyester resin compositions were prepared by melt-kneading PBT, the layered material (B-1) obtained in Production Example 1, ME 100 and AO60 in the weight proportions specified in Table 5 in the same manner as in Example 1 and evaluated. The results are shown in Table 5.

TABLE 5

| | Examples | | Comparative Examples | |
|---|---|---|---|---|
| | 8 | 9 | 7 | 8 |
| PBT (wt parts) | 100 | 100 | 100 | 100 |
| A-1 (wt parts) | 20 | | | |
| A-3 (wt parts) | | 20 | | |
| ME100 (wt parts) | | | 11 | |
| B-1 (wt parts) | | | | 20 |
| Proportion (%) of particles with [D] ≤ 3000 Å | 54 | 48 | 0 | 52 |
| Mean [D] (Å) | 2640 | 3100 | 24200 | 2860 |
| [N] (particles/wt % · 100 μ²) | 46 | 41 | 5 | 37 |
| Mean aspect ratio | 52 | 38 | 1.5 (*1) | 44 |
| Mean layer thickness (Å) | 290 | 340 | ca 3 · 10⁴ (*2) | 330 |
| Maximum layer thickness (Å) | 1340 | 1610 | ca 9 · 10⁵ (*3) | 1350 |
| Ash content (wt %) | 10.1 | 10.4 | 10.1 | 10.2 |
| Flexural modulus (MPa) | 4720 | 4590 | 2960 | 4670 |
| Flexural strength (MPa) | 105 | 104 | 110 | 105 |
| Flexural strength after 5 minutes of retention (MPa) | 98 | 95 | 104 | Unmoldable (*4) |
| Warpage (mm) | 3.1 | 3.5 | 11.2 | 3.2 |
| Gloss (%) | 82 | 80 | 70 | 81 |

As seen in Table 5, ME 100, without polyether compound treatment, could not be finely dispersed in the form of thin platelets, hence could not improve the flexural characteristics or give good flat test specimens. When the treatment was carried out with a polyether compound (PEG 400) having a hydroxyl value higher than 30 mg KOH/g (B-1), very poor thermal stability resulted and no well balanced moldings could be obtained, although the flexural characteristics were improved.

EXAMPLES 10 AND 11

Polyester resin compositions were prepared by melt-kneading the PPT obtained in Production Example 2, the layered material (A-1, A-3) obtained in Production Example 1 and AO60 in the weight proportions specified in Table 6 in the same manner as in Example 1 and evaluated. The results are shown in Table 6.

COMPARATIVE EXAMPLES 9 AND 10

Polyester resin compositions were prepared by melt-kneading the PPT obtained in Production Example 2, the layered material (B-1) obtained in Production Example 1, ME 100 and AO60 in the weight proportions specified in Table 6 in the same manner as in Example 1 and evaluated. The results are shown in Table 6.

TABLE 6

|  | Examples | | Comparative Examples | |
|---|---|---|---|---|
|  | 10 | 11 | 9 | 10 |
| PPT (wt parts) | 100 | 100 | 100 | 100 |
| A-1 (wt parts) | 20 | | | |
| A-3 (wt parts) | | 20 | | |
| ME100 (wt parts) | | | 11 | |
| B-1 (wt parts) | | | | 20 |
| Proportion (%) of particles with [D] ≦ 3000 Å | 55 | 50 | 0 | 52 |
| Mean [D] (Å) | 2610 | 3040 | 25400 | 2750 |
| [N] (particles/wt % · 100 μ$^2$) | 48 | 43 | 4 | 41 |
| Mean aspect ratio | 56 | 41 | 1.5 (*1) | 44 |
| Mean layer thickness (Å) | 280 | 330 | ca 3 · 10$^4$ (*2) | 360 |
| Maximum layer thickness (Å) | 1320 | 1600 | ca 9 · 10$^5$ (*3) | 1350 |
| Ash content (wt %) | 10.1 | 10.4 | 10.1 | 10.2 |
| Flexural modulus (MPa) | 4410 | 4350 | 3250 | 4390 |
| Flexural strength (MPa) | 105 | 104 | 115 | 104 |
| Flexural strength after 5 minutes of detension (MPa) | 99 | 95 | 109 | Unmoldable (*4) |
| Warpage (mm) | 3.5 | 3.6 | 11.2 | 3.8 |
| Gloss (%) | 84 | 82 | 71 | 82 |

As seen in Table 6, ME 100, without polyether compound treatment, could not be finely dispersed in the form of thin platelets, hence could not improve the flexural characteristics or give good flat test specimens. When the treatment was carried out with a polyether compound (PEG 400) having a hydroxyl value higher than 30 mg KOH/g (B-1), very poor thermal stability resulted and no well balanced moldings could be obtained, although the flexural characteristics were improved.

PRODUCTION EXAMPLE 3

Deionized water was blended with the layered material. Then, the polyether compound was added and treatment was effected by continuously stirring for 15 to 30 minutes. The mixture was then dried to a powder form. The layered materials (clays A-7 to A-14 and clays B-4 to B-6) were thus obtained. The weight proportions of the raw materials used in this production example are shown in Table 7.

TABLE 7

|  | A-7 | A-8 | A-9 | A-10 | A-11 | A-12 | A-13 | A-14 | B-4 | B-5 | B-6 |
|---|---|---|---|---|---|---|---|---|---|---|---|
| Deionized water | 100 | | | | | | | | | | |
| ME100 | 8 | 8 | 8 | 8 | 8 | 8 | 8 | | 8 | 8 | |
| Kunipia F | | | | | | | | 5 | | | 5 |
| Bisol 18EN | 4 | 2.5 | 1.6 | 0.8 | | | | 2.5 | | | |
| Bisol 10EN | | | | | 4.8 | 3 | 1.3 | | | | |
| PEG1000 | | | | | | | | | 4 | | 4 |
| PEG400 | | | | | | | | | | 4 | |

EXAMPLES 12 TO 20

Polyester resin compositions were prepared by melt-kneading PET and the layered material (A-7 to A-14) obtained in Production Example 3 in the weight proportions shown in Table 8, together with 0.2 part by weight of AO60 per 100 parts by weight of the resin, in a twin-screw extruder (Japan Steel Works' model TEX44) and evaluated. The results are shown in Table 8.

TABLE 8

| | Examples | | | | | | | | |
|---|---|---|---|---|---|---|---|---|---|
| | 12 | 13 | 14 | 15 | 16 | 17 | 18 | 19 | 20 |
| PET (wt parts) | 100 | | | | | | | | |
| Clay A-7 (wt parts) | 15 | | | | | | | | |
| Clay A-8 (wt parts) | | 13.5 | | | | | | | |
| Clay A-9 (wt parts) | | | 12 | 28 | | | | | |
| Clay A-10 (wt parts) | | | | | 11 | | | | |
| Clay A-11 (wt parts) | | | | | | 18 | | | |
| Clay A-12 (wt parts) | | | | | | | 18 | | |
| Clay A-13 (wt parts) | | | | | | | | 16 | |
| Clay A-14 (wt parts) | | | | | | | | | 15 |
| Ash content (wt %) | 9.1 | 9.3 | 9.2 | 18.1 | 9.1 | 9.5 | 11.1 | 11.7 | 9.1 |
| Proportion (%) of particles with [D] ≦ 3000 Å | 89 | 85 | 76 | 70 | 67 | 69 | 51 | 35 | 73 |
| Mean [D] (Å) | 1130 | 1210 | 1840 | 2080 | 2230 | 2350 | 3420 | 4170 | 2290 |
| [N] (particles/wt % · 100 µ$^2$) | 130 | 122 | 94 | 86 | 80 | 75 | 58 | 46 | 85 |
| Mean aspect ratio | 135 | 116 | 101 | 92 | 88 | 85 | 64 | 51 | 88 |
| Mean layer thickness (Å) | 88 | 101 | 116 | 134 | 145 | 148 | 228 | 345 | 140 |
| Maximum layer thickness (Å) | 360 | 410 | 520 | 600 | 650 | 670 | 940 | 1520 | 680 |
| Flexural modulus (MPa) | 5700 | 5740 | 5810 | 8020 | 5910 | 5400 | 5010 | 4850 | 4900 |
| Flexural strength (MPa) | 110 | 115 | 113 | 124 | 115 | 103 | 98 | 91 | 98 |
| Flexural strength after 5 minutes of retention (MPa) | 86 | 97 | 98 | 105 | 100 | 80 | 78 | 75 | 77 |
| Warpage (mm) | 2.1 | 2.2 | 2.2 | 1.3 | 2.2 | 2.1 | 3.8 | 4.1 | 3.2 |
| Gloss (%) | 91 | 92 | 90 | 89 | 90 | 86 | 82 | 81 | 84 |

COMPARATIVE EXAMPLES 11 TO 16

Compositions were prepared by melt-kneading PET, the layered material (B-4 to B-6) obtained in Production Example 3, ME100, Kunipia F, glass fiber (Nippon Electric Glass' T-195H) and AO60 in the weight proportions given in Table 9 in the same manner as in Example 12 and evaluated. The results are shown in Table 9.

TABLE 9

| | Comparative Examples | | | | | |
|---|---|---|---|---|---|---|
| | 11 | 12 | 13 | 14 | 15 | 16 |
| PET (wt parts) | 100 | | | | | |
| ME100 (wt parts) | 10 | | | | | |
| Kunipia F (wt parts) | | 10 | | | | |
| Clay B-4 (wt parts) | | | 18 | | | |
| Clay B-5 (wt parts) | | | | 18 | | |
| Clay B-6 (wt parts) | | | | | 24 | |
| GF (wt parts) | | | | | | 10 |
| Ash content (wt %) | 9.3 | 8.8 | 10.1 | 10.0 | 10.8 | 9.1 |
| Proportion (%) of particles with [D] ≦ 3000 Å | 0 | 0 | 55 | 42 | 40 | Not measured |
| Mean [D] (Å) | 24200 | 25800 | 2670 | 3510 | 3890 | Not measured |
| [N] (particles/wt % · 100 µ$^2$) | 5 | 3 | 40 | 33 | 31 | Not measured |
| Mean aspect ratio | 1.5 (*1) | 1.5 (*1) | 48 | 37 | 34 | Not measured |
| Mean layer thickness (Å) | ca 3 · 10$^4$ (*2) | ca 3 · 10$^4$ (*2) | 310 | 390 | 410 | Not measured |
| Maximum layer thickness (Å) | ca 9 · 10$^5$ (*3) | ca 9 · 10$^5$ (*3) | 1250 | 1460 | 1680 | Not measured |
| Flexural modulus (MPa) | 3650 | 3780 | 4550 | 4500 | 4180 | 5250 |
| Flexural strength (MPa) | 115 | 110 | 104 | 103 | 89 | 120 |
| Flexural strength after 5 minutes of retention (MPa) | 109 | 98 | Unmoldable (*4) | Unmoldable (*4) | Unmoldable (*4) | 114 |
| Warpage (mm) | Nonmeasurable (*5) | Nonmeasurable (*5) | 3.5 | 3.8 | 4.8 | 16.2 |
| Gloss (%) | Nonmeasurable (*5) | Nonmeasurable (*5) | 80 | 79 | 75 | 51 |

(*1) Since dispersion in platelet form was unattainable, the major axis/minor axis ratio of dispersed particles was taken.
(*2) Since dispersion in platelet form was unattainable, the number average minor axis of dispersed particles was taken.
(*3) Since dispersion in platelet form was unattainable, the maximum minor axis of dispersed particles was taken.
(*4) Unmoldable since the retention resulted in a marked decrease in viscosity.
(*5) Nonmeasurable since the molded product showed marked deformation.

As is seen from Table 9, ME 100 or Kunipia F, without polyether treatment, failed to improve the flexural characteristics or give good flat test specimens. When the treatment was carried out with a polyether compound (PEG 400, PEG 1000) having no cyclic hydrocarbon group, retention in molten state resulted in marked deterioration of flexural characteristics and the thermal stability was poor, although the flexural characteristics after molding were improved. Glass fiber impaired the warpage and/or gloss features. Thus, in Comparative Examples 11 to 16, no well-balanced moldings could be obtained.

EXAMPLES 21 AND 22

Polyester resin compositions were prepared by melt-kneading PBT, the layered material (A-8 or A-10) obtained in Production Example 3 and AO60 in the weight proportions specified in Table 10 in the same manner as in Example 12 and evaluated. The results are shown in Table 10.

COMPARATIVE EXAMPLES 17 AND 18

Compositions were prepared by melt-kneading PBT, the layered material (B-4) obtained in Production Example 3, ME 100 and AO60 in the weight proportions specified in Table 10 in the same manner as in Example 12 and evaluated. The results are shown in Table 10.

TABLE 10

|  | Examples | | Comparative Examples | |
|---|---|---|---|---|
|  | 21 | 22 | 17 | 18 |
| PBT (wt parts) | 100 | 100 | 100 | 100 |
| Clay A-8 (wt parts) | 13.5 | | | |
| Clay A-10 (wt parts) | | 11 | | |
| ME100 (wt parts) | | | 10 | |
| Clay B-4 (wt parts) | | | | 18 |
| Ash content (wt %) | 9.3 | 9.1 | 9.3 | 10.1 |
| Proportion (%) of particles with [D] ≦ 3000 Å | 82 | 64 | 0 | 52 |
| Mean [D] (Å) | 1280 | 2450 | 25000 | 2850 |
| [N] (particles/wt % · 100 µ$^2$) | 116 | 76 | 4 | 38 |
| Mean aspect ratio | 108 | 80 | 1.5 (*1) | 43 |
| Mean layer thickness (Å) | 121 | 167 | ca 3 · 10$^4$ (*2) | 330 |
| Maximum layer thickness (Å) | 430 | 700 | ca 9 · 10$^5$ (*3) | 1320 |
| Flexural modulus (MPa) | 4820 | 4850 | 2950 | 4660 |
| Flexural strength (MPa) | 115 | 118 | 110 | 105 |
| Flexural strength after 5 minutes of retention (MPa) | 99 | 103 | 104 | Unmoldable (*4) |
| Warpage (mm) | 2.0 | 2.0 | 10.9 | 3.1 |
| Gloss (%) | 92 | 90 | 78 | 82 |

(*1) Since dispersion in platelet form was unattainable, the major axis/minor axis ratio of dispersed particles was taken.
(*2) Since dispersion in platelet form was unattainable, the number average minor axis of dispersed particles was taken.
(*3) Since dispersion in platelet form was unattainable, the maximum minor axis of dispersed particles was taken.
(*4) Unmoldable since the retention resulted in a marked decrease in viscosity.

As seen in Table 10, ME 100, without polyether compound treatment, could not improve the flexural characteristics or give good flat test specimens. When the treatment was carried out with a polyether compound (PEG 1000) having no cyclic hydrocarbon group, retention in molten state resulted in marked deterioration of flexural characteristics and the thermal stability was poor, although the flexural characteristics after molding were improved. Thus, in Comparative Examples 17 and 18, no well-balanced moldings could be obtained.

EXAMPLES 23 AND 24

Polyester resin compositions were prepared by melt-kneading the PPT obtained in Production Example 2, the layered material (A-8 or A-10) obtained in Production Example 3 and AO60 in the weight proportions specified in Table 11 in the same manner as in Example 12 and evaluated. The results are shown in Table 11.

COMPARATIVE EXAMPLES 19 AND 20

Compositions were prepared by melt-kneading the PPT obtained in Production Example 2, the layered material (B-4) obtained in Production Example 3, ME 100 and AO60 in the weight proportions specified in Table 11 in the same manner as in Example 12 and evaluated. The results are shown in Table 11.

TABLE 11

|  | Examples | | Comparative Examples | |
|---|---|---|---|---|
|  | 23 | 24 | 19 | 20 |
| PPT (wt parts) | 100 | 100 | 100 | 100 |
| Clay A-8 (wt parts) | 13.5 | | | |
| Clay A-10 (wt parts) | | 11 | | |
| ME100 (wt parts) | | | 10 | |
| Clay B-4 (wt parts) | | | | 18 |
| Ash content (wt %) | 9.2 | 9.2 | 9.3 | 10.2 |
| Proportion (%) of particles with [D] ≦ 3000 Å | 83 | 66 | 0 | 53 |
| Mean [D] (Å) | 1250 | 2340 | 25000 | 2740 |
| [N] (particles/wt % · 100 µ$^2$) | 118 | 78 | 4 | 40 |
| Mean aspect ratio | 111 | 84 | 1.5 (*1) | 45 |
| Mean layer thickness (Å) | 119 | 151 | ca 3 · 10$^4$ (*2) | 380 |
| Maximum layer thickness (Å) | 430 | 680 | ca 9 · 10$^5$ (*3) | 1320 |
| Flexural modulus (MPa) | 5330 | 5380 | 3210 | 4380 |
| Flexural strength (MPa) | 112 | 117 | 114 | 105 |
| Flexural strength after 5 minutes of retention (MPa) | 98 | 103 | 108 | Unmoldable (*4) |
| Warpage (mm) | 1.9 | 2.0 | 11.1 | 3.7 |
| Gloss (%) | 92 | 90 | 78 | 84 |

(*1) Since dispersion in platelet form was unattainable, the major axis/minor axis ratio of dispersed particles was taken.
(*2) Since dispersion in platelet form was unattainable, the number average minor axis of dispersed particles was taken.
(*3) Since dispersion in platelet form was unattainable, the maximum minor axis of dispersed particles was taken.
(*4) Unmoldable since the retention resulted in a marked decrease in viscosity.

As seen in Table 11, ME 100, without polyether compound treatment, could not improve the flexural characteristics or give good flat test specimens. When the treatment was carried out with a polyether compound (PEG 1000) having no cyclic hydrocarbon group, retention in molten state resulted in marked deterioration of flexural characteristics and the thermal stability was poor, although the flexural characteristics were improved. Thus, in Comparative Examples 19 and 20, no well balanced moldings could be obtained.

PRODUCTION EXAMPLE 4

Deionized water was blended with the layered material. Then, the polyether compound was added and treatment was effected by continuously stirring for 15 to 60 minutes. The mixture was then dried to a powder form. The treated clays (layered materials A-15 and A-16) were thus obtained. The weight proportions of the raw materials used in this production example are shown in Table 12.

TABLE 12

|  | A-15 | A-16 |
|---|---|---|
| Deionized water (wt parts) | 100 | 100 |
| ME100 (wt parts) | 8 | 8 |
| Bisol 18EN (wt parts) | 0.8 |  |
| PEG1000 (wt parts) |  | 2 |

EXAMPLES 25 TO 29

Polyester resin compositions were prepared by melt-kneading PET, the layered material (A-15 or A-16) obtained in Production Example 4 and a phosphorus-containing stabilizer (C-1 to C-3) in the weight proportions shown in Table 13 in a twin-screw extruder (Japan Steel Works' model TEX44) at a preset temperature of 230 to 260 □ and evaluated. The results are shown in Table 13.

COMPARATIVE EXAMPLES 21 AND 22

Compositions were prepared by melt-kneading PET and ME 100 or the layered material (A-16) obtained in Production Example 4 in the weight proportions shown in Table 13 in the same manner as in Example 25 and evaluated. The results are shown in Table 13.

TABLE 13

|  |  | Examples | | | | | Compar. Ex. | |
|---|---|---|---|---|---|---|---|---|
|  |  | 25 | 26 | 27 | 28 | 29 | 21 | 22 |
| PET (wt parts) |  | 100 | 100 | 100 | 100 | 100 | 100 | 100 |
| Layered material | A-15 | 14 | 28 | 14 | 14 |  |  |  |
| (wt parts) | A-16 |  |  |  |  | 16 |  | 16 |
| ME100 (wt parts) |  |  |  |  |  |  | 12 |  |
| Stabilizer | C-1 | 0.3 | 0.3 |  |  | 0.4 |  |  |
| (wt parts) | C-2 |  |  | 0.3 |  |  |  |  |
|  | C-3 |  |  |  | 0.3 |  |  |  |
| Proportion (%) of particles with [D] ≦ 3000 Å |  | 69 | 60 | 70 | 68 | 53 | 0 | 52 |
| Mean [D] (Å) |  | 2200 | 2450 | 2190 | 2210 | 2710 | 24500 | 2720 |
| [N] |  | 85 | 70 | 86 | 82 | 47 | 4 | 46 |
| Mean aspect ratio |  | 93 | 83 | 92 | 90 | 48 | 1.5 (*1) | 47 |
| Mean layer thickness (Å) |  | 145 | 160 | 143 | 147 | 316 | ca $3 \cdot 10^4$ (*2) | 320 |
| Maximum layer thickness (Å) |  | 610 | 700 | 615 | 620 | 1280 | ca $9 \cdot 10^5$ (*3) | 1290 |
| Ash content (wt %) |  | 11.2 | 19.9 | 11.1 | 11.0 | 11.1 | 11.5 | 11.1 |
| Flexural modulus (MPa) |  | 6110 | 8170 | 6080 | 6090 | 5670 | 4150 | 5600 |
| Flexural strength (MPa) |  | 115 | 124 | 114 | 115 | 101 | 118 | 84 |
| Flexural strength after 15 minutes of retention (MPa) |  | 98 | 101 | 96 | 96 | 84 | 102 | Unmoldable (*4) |
| Warpage (mm) |  | 1.2 | 0.5 | 1.5 | 1.2 | 1.8 | Nonmeasurable (*5) | 1.9 |
| Gloss (%) |  | 91 | 90 | 91 | 89 | 86 | Nonmeasurable (*5) | 86 |

(*1) Since dispersion in platelet form was unattainable, the major axis/minor axis ratio of dispersed particles was taken.
(*2) Since dispersion in platelet form was unattainable, the number average minor axis of dispersed particles was taken.
(*3) Since dispersion in platelet form was unattainable, the maximum minor axis of dispersed particles was taken.
(*4) Unmoldable since the retention resulted in a marked decrease in melt viscosity.
(*5) Nonmeasurable since the molded product showed marked deformation.

As is seen from Table 13, the composition obtained by kneading the resin with ME 100 by twin-screw extrusion showed good thermal stability but could not give improved flexural characteristics since ME 100 was not finely dispersed in the form of thin platelets; the flat moldings showed deformation such that the warpage or surface gloss could hardly be measured. In the system in which the layered material obtained in Production Example 4 was used, the early stage moldings were excellent in flexural characteristics, warpage and surface gloss but, after retention in molten state, remarkable decreases in strength resulted due to the decrease in viscosity, and the thermal stability was poor.

EXAMPLES 30 AND 31

Polyester resin compositions were prepared by melt-kneading PBT, the layered material (A-15) obtained in Production Example 4 and a phosphorus-containing stabilizer in the weight proportions specified in Table 14 in the same manner as in Example 25 and evaluated. The results are shown in Table 14.

COMPARATIVE EXAMPLE 23

A composition was prepared by melt-kneading PBT, ME 100 and the layered material (A-15) obtained in Production Example 4 in the weight proportions specified in Table 14 in the same manner as in Example 25 and evaluated. The results are shown in Table 14.

TABLE 14

|  | Examples | | Compar. Ex. |
| --- | --- | --- | --- |
|  | 30 | 31 | 23 |
| PBT (wt parts) | 100 | 100 | 100 |
| Layered material A-15 (wt parts) | 14 | 28 |  |
| ME100 (wt parts) |  |  | 12 |
| Stabilizer C-1 (wt parts) | 0.3 | 0.3 |  |
| Proportion (%) of particles with [D] ≦ 3000 Å | 64 | 60 | 0 |
| Mean [D] (Å) | 2480 | 2680 | 24700 |
| [N] | 76 | 70 | 4 |
| Mean aspect ratio | 80 | 69 | 1.5 (*1) |
| Mean layer thickness (Å) | 168 | 181 | ca 3 · 10$^4$ (*2) |
| Maximum layer thickness (Å) | 695 | 760 | ca 9 · 10$^5$ (*3) |
| Ash content (wt %) | 11.2 | 19.0 | 11.2 |
| Flexural modulus (MPa) | 5450 | 7380 | 3010 |
| Flexural strength (MPa) | 116 | 120 | 118 |
| Flexural strength after 15 minutes of retention (MPa) | 100 | 96 | 111 |
| Warpage (mm) | 1.4 | 0.7 | 15.3 |
| Gloss (%) | 90 | 86 | 71 |

(*1) Since dispersion in platelet form was unattainable, the major axis/minor axis ratio of dispersed particles was taken.
(*2) Since dispersion in platelet form was unattainable, the number average minor axis of dispersed particles was taken.
(*3) Since dispersion in platelet form was unattainable, the maximum minor axis of dispersed particles was taken.

The composition obtained by kneading the resin with ME 100 by twin-screw extrusion showed good thermal stability but could not improve the flexural characteristics since ME 100 was not finely dispersed in the form of thin platelets; the flat moldings showed deformation such that the warpage or surface gloss could hardly be measured. In the system in which the layered material obtained in Production Example 4 was used, the early stage moldings were excellent in flexural characteristics, warpage and surface gloss but, after retention in molten state, remarkable decreases in strength resulted due to the decrease in viscosity, and the thermal stability was poor.

EXAMPLE 32

A polyester resin composition was prepared by melt-kneading the PPT obtained in Production Example 2, the layered material (A-15) obtained in Production Example 4 and a phosphorus-containing stabilizer in the weight proportions specified in Table 15 in the same manner as in Example 25 and evaluated. The results are shown in Table 15.

COMPARATIVE EXAMPLE 24

A composition was prepared by melt-kneading the PPT obtained in Production Example 2, ME 100 and the layered material (A-15) obtained in Production Example 4 in the weight proportions specified in Table 15 in the same manner as in Example 25 and evaluated. The results are shown in Table 15.

TABLE 15

|  | Ex. 32 | Compar. Ex. 24 |
| --- | --- | --- |
| PPT (wt parts) | 100 | 100 |
| Layered material A-15 (wt parts) | 14 |  |
| ME100 (wt parts) |  | 12 |
| Stabilizer C-1 (wt parts) | 0.3 |  |
| Proportion (%) of particles with [D] ≦ 3000 Å | 66 | 0 |
| Mean [D] (Å) | 2350 | 25100 |
| [N] | 82 | 4 |
| Mean aspect ratio | 88 | 1.5 (*1) |
| Mean layer thickness (Å) | 168 | ca 3 · 10$^4$ (*2) |
| Maximum layer thickness (Å) | 695 | ca 9 · 10$^5$ (*3) |
| Ash content (wt %) | 11.2 | 11.2 |
| Flexural modulus (MPa) | 5700 | 3320 |
| Flexural strength (MPa) | 110 | 117 |
| Flexural strength after 15 minutes of retention (MPa) | 97 | 111 |
| Warpage (mm) | 1.6 | 15.3 |
| Gloss (%) | 90 | 69 |

(*1) Since dispersion in platelet form was unattainable, the major axis/minor axis ratio of dispersed particles was taken.
(*2) Since dispersion in platelet form was unattainable, the number average minor axis of dispersed particles was taken.
(*3) Since dispersion in platelet form was unattainable, the maximum minor axis of dispersed particles was taken.

The composition obtained by kneading by twin-screw extrusion of ME 100 and the resin showed good thermal stability but could not improve the flexural characteristics since ME 100 was not finely dispersed in the form of thin platelets; the flat moldings showed deformation such that the warpage or surface gloss could hardly be measured. In the system in which the layered material obtained in Production Example 4 was used, the early stage moldings were excellent in flexural characteristics, warpage and surface gloss but, after retention in molten state, remarkable decreases in strength resulted due to the decrease in viscosity, and the thermal stability was poor.

EXAMPLES 33 TO 38

Flame-retardant polyester resin compositions were prepared by melt-kneading PET, the layered material obtained in Production Example 4 and a phosphorus-containing flame retardant in the weight proportions specified in Table 16 using a twin-screw extruder (Japan Steel Works' model TEX44) at a preset temperature of 230 to 260° C. and evaluated. The results are shown in Table 16.

COMPARATIVE EXAMPLES 25 AND 26

Compositions were prepared by melt-kneading PET, ME 100, a polytetrafluoroethylene resin (Daikin Industries' Polyflon FA-500) and a phosphorus-containing flame retardant in the weight proportions specified in Table 16 in the same manner as in Example 33 and evaluated. The results are shown in Table 16.

TABLE 16

|  |  | Examples |  |  |  |  |  | Compar. Ex. |  |
|---|---|---|---|---|---|---|---|---|---|
|  |  | 33 | 34 | 35 | 36 | 37 | 38 | 25 | 26 |
| PET |  | 100 | 100 | 100 | 100 | 100 | 100 | 100 | 100 |
| Layered material | A-15 | 14 | 28 | 15 | 15 | 14 |  |  |  |
|  | A-16 |  |  |  |  |  | 16 |  |  |
| ME100 (mean ca 40–120 μm) |  |  |  |  |  |  |  | 12 | 12 |
| Flame retardant | F-1 | 1.5 | 1.2 |  |  |  | 1.8 | 1.5 | 1.5 |
|  | F-2 |  |  | 8 |  |  |  |  |  |
|  | F-3 |  |  |  | 8 |  |  |  |  |
|  | F-4 |  |  |  |  | 10 |  |  |  |
| MC440 |  | 8 | 6 | 10 | 10 |  | 9 | 8 | 8 |
| FA500 |  |  |  |  |  |  |  |  | 0.5 |
| Proportion (%) of particles with [D] ≦ 3000 Å |  | 68 | 60 | 69 | 67 | 65 | 54 | 0 | 0 |
| Mean [D] (Å) |  | 2210 | 2440 | 2190 | 2250 | 2310 | 2680 | 24500 | 25100 |
| [N] (particles/wt % · 100 μ$^2$) |  | 84 | 71 | 87 | 82 | 80 | 47 | 4 | 3 |
| Mean aspect ratio |  | 92 | 82 | 93 | 92 | 88 | 47 | 1.5 (*1) | 1.4 |
| Mean layer thickness (Å) |  | 145 | 160 | 141 | 147 | 150 | 315 | ca 3 · 10$^4$ (*2) | ca 3 · 10$^4$ (*2) |
| Maximum layer thickness (Å) |  | 620 | 705 | 610 | 620 | 650 | 1270 | ca 9 · 10$^5$ (*3) | ca 9 · 10$^5$ (*3) |
| Ash content (wt %) |  | 11.0 | 19.2 | 10.8 | 10.8 | 11.4 | 11.1 | 10.7 | 10.8 |
| UL94V test |  | V-0 | V-0 | V-1 | V-1 | V-1 | V-0 | Offgrade | V-0 |
| Flexural modulus (MPa) |  | 6060 | 8130 | 5590 | 5760 | 5480 | 4750 | 3600 | 3610 |
| Warpage (mm) |  | 1.2 | 0.5 | 1.6 | 1.3 | 1.4 | 1.8 | Nonmeasurable (*4) |  |
| Gloss (%) |  | 89 | 88 | 87 | 89 | 86 | 84 | Nonmeasurable (*4) |  |

(*1) Since dispersion in platelet form was unattainable, the major axis/minor axis ratio of dispersed particles was taken.
(*2) Since dispersion in platelet form was unattainable, the number average minor axis of dispersed particles was taken.
(*3) Since dispersion in platelet form was unattainable, the maximum minor axis of dispersed particles was taken.
(*4) Nonmeasurable since the molded product showed marked deformation.

As is seen in Table 16, secondary aggregation occurred in Comparative Example 25 and, in spite of the presence of ME 100 particles about 40 to 120 μm, the single use of the phosphorus-containing flame retardant could not prevent kindling drops from falling in the combustion test, so that the UL94 V requirements could not be satisfied, hence offgrade. In Comparative Examples 26, the dripping could be prevented by the combined use of the polytetrafluoroethylene resin (judgment V-0), but the mechanical characteristics, warpage feature, gloss and other physical properties were poor; no well-balanced moldings were obtained.

EXAMPLES 39 AND 40

Flame-retardant polyester resin compositions were prepared by melt-kneading PBT, the layered material obtained in Production Example 4, a phosphorus-containing flame retardant and so forth in the weight proportions specified in Table 17 in the same manner as in Example 33 and evaluated. The results are shown in Table 17.

COMPARATIVE EXAMPLES 27 AND 28

Flame-retardant polyester resin compositions were prepared by melt-kneading PBT, ME 100, a polytetrafluoroethylene resin (Daikin Industries' Polyflon FA-500) and a phosphorus-containing flame retardant in the weight proportions specified in Table 17 in the same manner as in Example 33 and evaluated. The results are shown in Table 17.

TABLE 17

|  |  | Ex. |  | Compar. Ex. |  |
|---|---|---|---|---|---|
|  |  | 39 | 40 | 27 | 28 |
| PBT |  | 100 | 100 | 100 | 100 |
| Layered material | A-15 | 14 | 28 |  |  |
| ME100 (mean ca 40–120 μm) |  |  |  | 12 | 12 |
| Flame retardant | F-1 | 1.7 | 1.2 | 1.7 | 1.7 |
| MC440 |  | 8 | 6 | 8 | 8 |
| FA500 |  |  |  |  | 0.5 |
| Proportion (%) of particles with [D] ≦ 3000 Å |  | 65 | 60 | 0 | 0 |
| Mean [D] (Å) |  | 2460 | 2680 | 24700 | 25000 |
| [N] (particles/wt % · 100 μ$^2$) |  | 78 | 70 | 4 | 3 |
| Mean aspect ratio |  | 80 | 69 | 1.5 (*1) | 1.4 |
| Mean layer thickness (Å) |  | 165 | 181 | ca 3 · 10$^4$ (*2) | ca 3 · 10$^4$ (*2) |
| Maximum layer thickness (Å) |  | 690 | 760 | ca 9 · 10$^5$ (*3) | ca 9 · 10$^5$ (*3) |
| Ash content (wt %) |  | 10.8 | 19.0 | 10.7 | 10.8 |
| UL94V |  | V-0 | V-0 | Offgrade | V-0 |
| Flexural modulus (MPa) |  | 5430 | 7410 | 3020 | 3120 |
| Warpage (mm) |  | 1.3 | 0.6 | 16.1 | 15.8 |
| Gloss (%) |  | 89 | 86 | 69 | 68 |

(*1) Since dispersion in platelet form was unattainable, the major axis/ minor axis ratio of dispersed particles was taken.
(*2) Since dispersion in platelet form was unattainable, the number average minor axis of dispersed particles was taken.
(*3) Since dispersion in platelet form was unattainable, the maximum minor axis of dispersed particles was taken.

As is seen in Table 17, secondary aggregation occurred in Comparative Example 27 and, in spite of the presence of ME 100 particles about 40 to 120 µm, the single use of the phosphorus-containing flame retardant could not prevent kindling drops from falling in the combustion test, so that the UL94 V requirements could not be satisfied, hence offgrade. In Comparative Examples 28, the dripping could be prevented by the combined use of the polytetrafluoroethylene resin (judgment V-0), but the mechanical characteristics, warpage feature, gloss and other physical properties were poor; no well-balanced moldings were obtained.

EXAMPLES 41 AND 42

Flame-retardant polyester resin compositions were prepared by melt-kneading the PPT obtained in Production Example 2, the layered material obtained in Production Example 4, a phosphorus-containing flame retardant and so forth in the weight proportions specified in Table 18 in the same manner as in Example 33 and evaluated. The results are shown in Table 18.

COMPARATIVE EXAMPLES 29 AND 30

Compositions were prepared by melt-kneading the PPT, ME 100, a polytetrafluoroethylene resin (Daikin Industries' Polyflon FA-500) and a phosphorus-containing flame retardant in the weight proportions specified in Table 18 in the same manner as in Example 33 and evaluated. The results are shown in Table 18.

TABLE 18

|  | Examples | | Compar. Ex. | |
| --- | --- | --- | --- | --- |
|  | 41 | 42 | 29 | 30 |
| PBT | 100 | 100 | 100 | 100 |
| Layered material  A-15 | 14 | 28 |  |  |
| ME100 (mean ca 40–120 µm) |  |  | 12 | 12 |
| Flame retardant  F-1 | 1.6 | 1.2 | 1.7 | 1.7 |
| MC440 | 8 | 6 | 8 | 8 |
| FA500 |  |  |  | 0.5 |
| Proportion (%) of particles with [D] ≦ 3000 Å | 65 | 60 | 0 | 0 |
| Mean [D] (Å) | 2460 | 2680 | 24600 | 25100 |
| [N] (particles/wt % · 100 µ$^2$) | 78 | 70 | 4 | 3 |
| Mean aspect ratio | 80 | 69 | 1.5(*1) | 1.4 |
| Mean layer thickness (Å) | 165 | 181 | Ca 3 · 10$^4$ (*2) | ca 3 · 10$^4$ (*2) |
| Maximum layer thickness (Å) | 690 | 760 | Ca 9 · 10$^5$ (*3) | ca 9 · 10$^5$ (*3) |
| Ash content (wt %) | 10.9 | 18.9 | 10.6 | 10.7 |
| UL94V | V-0 | V-0 | Offgrade | V-0 |
| Flexural modulus (MPa) | 5710 | 7750 | 5050 | 4990 |
| Warpage (mm) | 1.2 | 0.5 | Nonmeasurable (*4) |  |
| Gloss (%) | 89 | 87 | Nonmeasurable (*4) |  |

(*1) Since dispersion in platelet form was unattainable, the major axis/minor axis ratio of dispersed particles was taken.
(*2) Since dispersion in platelet form was unattainable, the number average minor axis of dispersed particles was taken.
(*3) Since dispersion in platelet form was unattainable, the maximum minor axis of dispersed particles was taken.
(*4) Nonmeasurable since the molded product showed marked deformation.

As is seen in Table 18, secondary aggregation occurred in Comparative Example 29 and, in spite of the presence of ME 100 particles about 40 to 120 µm, the single use of the phosphorus-containing flame retardant could not prevent kindling drops from falling in the combustion test, so that the UL94 V requirements could not be satisfied, hence offgrade. In Comparative Examples 30, the dripping could be prevented by the combined use of the polytetrafluoroethylene resin (judgment V-0), but the mechanical characteristics, warpage feature, gloss and other physical properties were poor; no well-balanced moldings were obtained.

PRODUCTION EXAMPLE 5

Deionized water was blended with the layered material. Then, the polyether compound was added and treatment was effected by continuously stirring for 15 to 60 minutes. The mixture was then dried to a powder form. The treated clays (layered materials A-17 and A-18) were thus obtained. The weight proportions of the raw materials used in this production example are shown in Table 19.

TABLE 19

|  | A–17 | A–18 |
| --- | --- | --- |
| Deionized water | 100 | 100 |
| ME100 | 8 | 8 |
| Disol 18EN | 2.4 | 0.8 |

EXAMPLES 43 TO 47

Polyester resin compositions were prepared by melt-kneading PET, the layered material (A-17 or A-18) obtained in Production Example 5 and an epoxy compound (D-1 or D-2)) in the weight proportions shown in Table 20 in a twin-screw extruder (Japan Steel Works' model TEX44) at a preset temperature of 230 to 260° C. and evaluated. The results are shown in Table 20.

COMPARATIVE EXAMPLES 31 AND 32

Compositions were prepared by melt-kneading PET, together with ME 100, the layered material (A-17) obtained in Production Example 5 or an epoxy compound (D-1) in the weight proportions shown in Table 20 in the same manner as in Example 43 and evaluated. The results are shown in Table 20.

TABLE 20

|  | Ex. | | | | | Compar. Ex. | |
| --- | --- | --- | --- | --- | --- | --- | --- |
|  | 43 | 44 | 45 | 46 | 47 | 31 | 32 |
| PET (wt parts) | 100 | 100 | 100 | 100 | 100 | 100 | 100 |
| Layered compound  A-17 | 9.5 | 19 |  |  | 30 |  |  |

TABLE 20-continued

|  |  | Ex. | | | | | Compar. Ex. | |
|---|---|---|---|---|---|---|---|---|
|  |  | 43 | 44 | 45 | 46 | 47 | 31 | 32 |
| (wt parts) | A-18 |  |  | 28 |  | 35 |  |  |
| ME100 |  |  |  |  |  |  | 12 |  |
| Epoxy compound | D-1 | 0.4 | 0.5 | 1 |  |  |  | 0.4 |
| (wt parts) | D-2 |  |  |  | 10 | 20 |  |  |
| Proportion (%) of particles with [D] ≦ 3000 Å |  | 73 | 71 | 60 | 69 | 57 | 0 | Not measured |
| Mean [D] (Å) |  | 1920 | 1950 | 2450 | 1970 | 2500 | 24500 |  |
| [N] |  | 88 | 85 | 69 | 84 | 67 | 4 |  |
| Mean aspect ratio |  | 102 | 101 | 83 | 99 | 79 | 1.5 (*1) |  |
| Mean layer thickness (Å) |  | 140 | 142 | 160 | 145 | 170 | ca $3 \cdot 10^4$ (*2) |  |
| Maximum layer thickness (Å) |  | 600 | 620 | 710 | 650 | 800 | ca $9 \cdot 10^5$ (*3) |  |
| Ash content (wt %) |  | 6.5 | 12.3 | 19.9 | 16.5 | 21.1 | 11.5 | 0.0 |
| Flexural modulus (MPa) |  | 4950 | 6210 | 8170 | 7290 | 8390 | 4150 | 3050 |
| Flexural strength (MPa) |  | 119 | 115 | 124 | 115 | 122 | 118 | 115 |
| Flexural strength after 15 minutes of retention (MPa) |  | 118 | 110 | 108 | 103 | 101 | 102 | Unmoldable (*4) |
| Flexural strength after treatment under high-temperature, high-humidity conditions (MPa) |  | 83 | 81 | 87 | 81 | 86 | 38 | 82 |
| Flow (method B) (× $10^{-2}$ ml/sec) |  | 26 | 32 | 37 | 40 | 35 | 24 | 22 |
| Flow (method B) after 15 minutes of retention |  | 26 | 33 | 40 | 43 | 41 | 26 | 6 |
| Warpage (mm) |  | 2.1 | 1.4 | 0.3 | 1.3 | 0.4 | Nonmeasurable (*5) | Nonmeasurable (*5) |
| Gloss (%) |  | 115 | 110 | 98 | 106 | 97 | Nonmeasurable (*5) | Nonmeasurable (*5) |

(*1) Since dispersion in platelet form was unattainable, the major axis/minor axis ratio of dispersed particles was taken.
(*2) Since dispersion in platelet form was unattainable, the number average minor axis of dispersed particles was taken.
(*3) Since dispersion in platelet form was unattainable, the maximum minor axis of dispersed particles was taken.
(*4) Unmoldable since the retention resulted in a marked decrease in melt viscosity.
(*5) Nonmeasurable since the molded product showed marked deformation.

As is seen from Table 20, the composition obtained by kneading the PET resin with ME 100 by twin-screw extrusion showed good thermal stability but could not give improved flexural characteristics since ME 100 was not finely dispersed in the form of thin platelets; the flat moldings showed deformation such that the warpage or surface gloss could hardly be measured. In the system in which the layered material obtained in Production Example 5 was used, the early stage physical characteristics were good, but, after retention in molten state, the processability was unstable due to the decrease in viscosity, and the strength characteristics lowered after retention and after high-temperature, high-humidity treatment. The composition resulting from addition of the epoxy compound to the PET resin, when retained in the molten state, showed increases in viscosity, hence worsened processability. Thus, it follows that polyester resin compositions well balanced among various physical properties can be obtained only when a polyether compound-treated layered material and an epoxy-containing compound are added to the PET resin.

EXAMPLES 48 AND 49

Polyester resin compositions were prepared by melt-kneading PBT, the layered material (A-17) obtained in Production Example 5 and an epoxy compound (D-1) in the weight proportions specified in Table 21 in the same manner as in Example 43 except that the preset temperature was 220 to 240° C. They were evaluated in the same manner. The results are shown in Table 21.

COMPARATIVE EXAMPLES 33 AND 34

Compositions were prepared by melt-kneading PBT, ME 100 and the epoxy compound (D-1) in the weight proportions specified in Table 21 in the same manner as in Example 48 and evaluated. The results are shown in Table 21.

TABLE 21

|  | Examples | | Comparative Examples | |
|---|---|---|---|---|
|  | 48 | 49 | 33 | 34 |
| PBT (wt parts) | 100 | 100 | 100 | 100 |
| Layered material A-17 (wt parts) | 9.5 | 19 |  |  |
| ME100 (wt parts) |  |  | 12 |  |
| Epoxy compound D-1 (wt parts) | 0.4 | 0.5 |  | 0.4 |
| Proportion (%) of particles with [D] ≦ 3000 Å | 70 | 68 | 0 | Not measured |
| Mean [D](Å) | 1960 | 2010 | 24700 |  |
| [N] | 85 | 81 | 4 |  |
| Mean aspect ratio | 100 | 97 | 1.5 (*1) |  |
| Mean layer thickness (Å) | 145 | 149 | ca $3 \cdot 10^4$ (*2) |  |
| Maximum layer thickness (Å) | 610 | 620 | ca $9 \cdot 10^5$ (*3) |  |
| Ash content (wt %) | 6.5 | 12.3 | 11.2 | 0.0 |
| Flexural modulus (MPa) | 4160 | 5600 | 3010 | 2640 |
| Flexural strength (MPa) | 106 | 115 | 118 | 114 |
| Flexural strength after 15 minutes of retention (MPa) | 105 | 114 | 111 | Unmoldable (*4) |
| Flexural strength after treatment under high- | 80 | 86 | 40 | 79 |

TABLE 21-continued

|  | Examples | | Comparative Examples | |
| --- | --- | --- | --- | --- |
|  | 48 | 49 | 33 | 34 |
| temperature, high-humidity conditions (MPa) | | | | |
| Flow (method B) (× $10^{-2}$) ml/sec | 32 | 40 | 28 | 29 |
| Flow (method B) after 15 minutes of retention | 32 | 40 | 30 | 7 |
| Warpage (mm) | 1.4 | 0.7 | 15.3 | 6.9 |
| Gloss (%) | 115 | 101 | 71 | 115 |

(*1) Since dispersion in platelet form was unattainable, the major axis/minor axis ratio of dispersed particles was taken.
(*2) Since dispersion in platelet form was unattainable, the number average minor axis of dispersed particles was taken.
(*3) Since dispersion in platelet form was unattainable, the maximum minor axis of dispersed particles was taken.
(*4) Unmoldable since the retention resulted in a marked decrease in melt viscosity.

As is seen in Table 21, the composition (Comparative Example 33) obtained by kneading the PBT resin with ME 100 by twin-screw extrusion showed good thermal stability, as revealed by the small differences between the flexural strength and method B flow values after 15 minutes of retention and those before retention, but could not give improved flexural characteristics since ME 100 was not finely dispersed in the form of thin platelets; the flat moldings were not improved with respect to warpage, either. In the system in which the layered material obtained in Production Example 5 was used, the early stage physical characteristics were good but, after retention in molten state, the method B flow value increased and the viscosity lowered, hence the processability was unstable; decreases in strength were observed after retention and after high-temperature, high-humidity treatment. The composition obtained by adding the epoxy compound, when retained in the molten state, showed increases in viscosity, as revealed by the decrease in method B flow value, hence showed worsened processability. Thus, it follows that polyester resin compositions well balanced among various physical properties can be obtained only when a polyether compound-treated layered material and an epoxy-containing compound are added to the PBT resin.

EXAMPLE 50

A polyester resin composition was prepared by melt-kneading the PPT obtained in Production Example 2, the layered material (A-17) obtained in Production Example 5 and an epoxy compound (D-1) in the weight proportions shown in Table 22 in the same manner as in Example 43 except that the preset temperature was 220 to 250° C. It was evaluated in the same manner. The results are shown in Table 22.

COMPARATIVE EXAMPLES 35 AND 36

A composition was prepared by melt-kneading the PPT obtained in Production Example 2, ME 100 and an epoxy compound (D-1) in the weight proportions shown in Table 22 in the same manner as in Example 50 and evaluated. The results are shown in Table 22.

TABLE 22

|  | Example | Comparative Examples | |
| --- | --- | --- | --- |
|  | 50 | 35 | 36 |
| PPT (wt parts) | 100 | 100 | 100 |
| Layered material A-17 (wt parts) | 9.5 | | |
| ME100 (wt parts) | | 7 | |
| Epoxy compound D-1 | 0.4 | | 0.4 |
| Proportion (%) of particles with [D] ≦ 3000 Å | 70 | 0 | Not measured |
| Mean [D] (Å) | 1950 | 25100 | |
| [N] | 85 | 4 | |
| Mean aspect ratio | 100 | 1.5 (*1) | |
| Mean layer thickness (Å) | 150 | ca $3 \cdot 10^4$ (*2) | |
| Maximum layer thickness (Å) | 620 | ca $9 \cdot 10^5$ (*3) | |
| Ash content (wt %) | 6.4 | 6.6 | 0.0 |
| Flexural modulus (MPa) | 4460 | 3100 | 2840 |
| Flexural strength (MPa) | 110 | 112 | 113 |
| Flexural strength after 15 minutes of retention (MPa) | 110 | 111 | Unmoldable (*4) |
| Flexural strength after treatment under high-temperature, high-humidity conditions (MPa) | 81 | 20 | 19 |
| Flow (method B) (× $10^{-2}$) ml/sec | 30 | 26 | 26 |
| Flow (method B) after 15 minutes of retention | 30 | 28 | 8 |
| Warpage (mm) | 1.6 | 15.3 | 6.5 |
| Gloss (%) | 115 | 69 | 116 |

(*1) Since dispersion in platelet form was unattainable, the major axis/minor axis ratio of dispersed particles was taken.
(*2) Since dispersion in platelet form was unattainable, the number average minor axis of dispersed particles was taken.
(*3) Since dispersion in platelet form was unattainable, the maximum minor axis of dispersed particles was taken.
(*4) Unmoldable since the retention resulted in a marked decrease in melt viscosity.

As is seen in Table 22, the composition (Comparative Example 35) obtained by kneading the PPT resin with ME 100 by twin-screw extrusion showed good thermal stability, as revealed by the small differences between the flexural strength and method B flow values after 15 minutes of retention and those before retention, but could not give improved flexural characteristics since ME 100 was not finely dispersed in the form of thin platelets; the flat moldings were not improved with respect to warpage, either. In the system in which the layered material obtained in Production Example 5 was used, the early stage physical characteristics were good but, after retention in molten state, the method B flow value increased and the viscosity lowered, hence the processability was unstable; decreases in strength were observed after retention and after high-temperature, high-humidity treatment. The composition obtained by adding the epoxy compound, when retained in the molten state, showed increases in viscosity, as revealed by the decrease in method B flow value, hence showed worsened processability. Thus, it follows that polyester resin compositions well balanced among various physical properties can be obtained only when a polyether compound-treated layered material and an epoxy-containing compound are added to the PPT resin.

EXAMPLES 51 TO 57

Deionized water, a layered material and a polyether compound were blended in the weight proportions shown in Table 23 for about 15 to 30 minutes. The mixture was then dried to a powder form (clays A-19 to A-25).

TABLE 23

|  | A-19 | A-20 | A-21 | A-22 | A-23 | A-24 | A-25 |
|---|---|---|---|---|---|---|---|
| Deionized water | 100 | | | | | | |
| ME100 | | 8 | 8 | 8 | 8 | | |
| Kunipia F | | | | | | 5 | 5 |
| Bisol 18EN | 12 | 4 | 2.5 | 0.5 | | 2.5 | |
| PEG1000 | | | | | 4 | | 4 |

PET, one of the layered materials (clays A-19 to A-25) shown in Table 23 and AO60 were melted and kneaded in the weight proportions shown in Table 24 using a twin-screw extruder (Japan Steel Works' model TEX44) at a preset temperature of 240 to 270° C.

The kneaded material in molten state was continuously transferred to a continuous polymerizer to thereby effect continuous polymerization. The thus-prepared polyester resin composition was evaluated. The results are shown in Table 24.

The polymerization temperature was 280° C., the polymerizer inside was under a reduced pressure of 0.5 to 5.0 torr (0.067 to 0.665 Mpa), the stirring by the polymerizer motor was carried out at 30 rpm, and the polymerization time was 50 to 70 minutes.

TABLE 24

|  | Examples | | | | | | |
|---|---|---|---|---|---|---|---|
|  | 51 | 52 | 53 | 54 | 55 | 56 | 57 |
| PET | 100 | 100 | 100 | 100 | 100 | 100 | 100 |
| Clay A-19 | 55 | | | | | | |
| Clay A-20 | | 33 | | | | | |
| Clay A-21 | | | 29 | | | | |
| Clay A-22 | | | | 23 | | | |
| Clay A-23 | | | | | 33 | | |
| Clay A-24 | | | | | | 33 | |
| Clay A-25 | | | | | | | 40 |
| Treatment for increasing the molecular weight | Yes | Yes | Yes | Yes | Yes | Yes | Yes |
| Ash content (wt %) | 17.3 | 17.5 | 17.7 | 17.9 | 17.6 | 16.9 | 16.8 |
| Proportion (%) of particles with [D] ≦ 3000 (Å) | 94 | 82 | 74 | 30 | 69 | 79 | 65 |
| Mean [D] (Å) | 920 | 1260 | 1850 | 4100 | 2290 | 1310 | 2460 |
| [N] (particles/wt % · 100 µ$^2$) | 145 | 116 | 87 | 39 | 78 | 105 | 79 |
| Mean aspect ratio | 138 | 104 | 92 | 27 | 81 | 98 | 75 |
| Mean layer thickness (Å) | 85 | 110 | 120 | 430 | 195 | 125 | 220 |
| Maximum layer thickness (Å) | 350 | 430 | 590 | 1760 | 730 | 580 | 890 |
| Flexural modulus (MPa) | 6760 | 7550 | 7910 | 7180 | 7240 | 7310 | 6680 |
| Flexural strength (MPa) | 120 | 125 | 131 | 119 | 110 | 116 | 105 |
| Flexural strength after 15 minutes of residence (MPa) | 114 | 119 | 124 | 115 | 104 | 102 | 90 |
| Warpage (mm) | 2.1 | 2.2 | 2.2 | 3.1 | 3.2 | 3.6 | 3.7 |
| Gloss (%) | 87 | 87 | 86 | 81 | 84 | 85 | 82 |

COMPARATIVE EXAMPLES 37 TO 39

PET, ME 100, Kunipia F and AO60 were melted and kneaded in the weight proportions shown in Table 25 in the same manner as in Example 51. The treatment for increasing the molecular weight after kneading was not performed. The evaluation results are shown in Table 25.

COMPARATIVE EXAMPLE 40

Compositions were obtained in the same manner as in Examples 52, 55 and 56, respectively, except that no treatment was made for increasing the molecular weight. The results of evaluation thereof are shown in Table 25.

COMPARATIVE EXAMPLE 41

PET, GF and AO60 were melted and kneaded in the weight proportions shown in Table 25 in the same manner as in Example 51. The treatment for increasing the molecular weight after kneading was not performed. The evaluation results are shown in Table 25.

TABLE 25

| | Comparative Examples | | | | |
|---|---|---|---|---|---|
| | 37 | 38 | 39 | 40 | 41 |
| PET | 100 | 100 | 100 | 100 | 100 |
| Clay A-23 | | | | 33 | |
| ME100 | | 22 | | | |
| Kunipia F | | | 22 | | |
| GF | | | | | 22 |
| Treatment for increasing the molecular weight | No | No | No | No | No |
| Ash content (wt %) | 0.0 | 17.9 | 17.0 | 17.6 | 17.9 |
| Proportion (%) of particles with $[D] \leq 3000$ Å | | 0 | 0 | 69 | Not measured |
| Mean $[D]$ (Å) | | 24200 | 25800 | 2290 | Not measured |
| $[N]$ (particles/wt % · 100 μ$^2$) | | 5 | 3 | 78 | Not measured |
| Mean aspect ratio | | 1.5 (*) | 1.5 (*) | 81 | Not measured |
| Mean layer thickness Å | | ca 3 · 10$^4$ (*2) | ca 3 · 10$^4$ (*2) | 195 | Not measured |
| Maximum layer thickness (Å) | | ca 9 · 10$^5$ (*3) | ca 9 · 10$^5$ (*3) | 730 | Not measured |
| Flexural modulus (MPa) | 3100 | 4250 | 4100 | 6870 | 7040 |
| Flexural strength (MPa) | 130 | 135 | 113 | 110 | 135 |
| Flexural strength after 15 minutes of residence (MPa) | 125 | 128 | 98 | Unmoldable (*4) | 129 |
| Warpage (mm) | Nonmeasurable (*5) | Nonmeasurable (*5) | Nonmeasurable (*5) | 3.2 | 25.3 |
| Gloss (%) | Nonmeasurable (*5) | Nonmeasurable (*5) | Nonmeasurable (*5) | 84 | 41 |

(*1) Since dispersion in platelet form was unattainable, the major axis/minor axis ratio of dispersed particles was taken.
(*2) Since dispersion in platelet form was unattainable, the number average minor axis of dispersed particles was taken.
(*3) Since dispersion in platelet form was unattainable, the maximum minor axis of dispersed particles was taken.
(*4) Unmoldable since the residence resulted in a marked decrease in viscosity.
(*5) Nonmeasurable since the molded product showed marked deformation.

As is seen in Table 25, those polyether compound treatment-free layered materials failed to improve the flexural characteristics and further failed to give good flat test specimens. When the molecular weight increasing treatment was not performed, retention in molten state resulted in decreases in viscosity to such an extent that molding was impossible or in marked decreases in flexural strength: the thermal stability was thus poor. Further, with GF, the thermal stability was not impaired but the warpage and gloss features were impaired.

EXAMPLE 58

The PBT resin, the layered material (clay A-20) shown in Table 23 and AO60 were melted and kneaded in the weight proportions shown in Table 26 using a twin-screw extruder (Japan Steel Works' model TEX44) at a preset temperature of 240 to 250° C.

The kneaded material in molten state was continuously transferred to a continuous polymerizer to thereby effect continuous polymerization. The thus-prepared polyester resin composition was evaluated. The results are shown in Table 26.

The polymerization temperature was 270° C., the polymerizer inside was under a reduced pressure of 0.5 to 5.0 torr (0.067 to 0.665 Mpa), the stirring by the polymerizer motor was carried out at 30 rpm, and the polymerization time was about 70 minutes.

COMPARATIVE EXAMPLE 42

PBT, ME 100 and AO60 were melted and kneaded in the weight proportions shown in Table 26 in the same manner as in Example 58. The molecular weight increasing treatment after kneading was not performed. The evaluation results are shown in Table 26.

TABLE 26

| | | Example 58 | Compar.Ex. 42 |
|---|---|---|---|
| PBT | wt parts | 100 | 100 |
| Clay A–20 | | 33 | |
| ME100 | | | 22 |
| Treatment for increasing the molecular weight | | Yes | No |
| Ash content | wt % | 17.5 | 17.9 |
| Proportion of particles with $[D] \leq 3000$ Å | % | 77 | 0 |
| Mean $[D]$ | Å | 1380 | 25300 |
| Number of dispersed particles $[N]$ | particles/wt % · 100 μ$^2$ | 105 | 4 |
| Mean aspect ratio | — | 124 | 1.5 (*1) |
| Mean layer thickness | Å | 135 | ca 3 · 10$^4$ (*2) |
| Maximum layer thickness | Å | 520 | ca 9 · 10$^5$ (*3) |
| Flexural modulus | MPa | 6330 | 3150 |
| Flexural strength | MPa | 124 | 116 |
| Flexural strength (after 15 minutes of retention) | MPa | 118 | 110 |

TABLE 26-continued

|  |  | Example 58 | Compar.Ex. 42 |
|---|---|---|---|
| Warpage (mm) | mm | 2.0 | 11.5 |
| Gloss (%) | % | 87 | 68 |

(*1) Since dispersion in platelet form was unattainable, the major axis/minor axis ratio of dispersed particles was taken.
(*2) Since dispersion in platelet form was unattainable, the number average minor axis of dispersed particles was taken.
(*3) Since dispersion in platelet form was unattainable, the maximum minor axis of dispersed particles was taken.
(*4) Unmoldable since the residence resulted in a marked decrease in viscosity.

As is seen in Table 26, the polyether compound treatment-free layered material failed to improve the flexural characteristics and further failed to give good flat test specimens.

EXAMPLE 59

The PPT resin obtained in Production Example 2, the layered material (clay A-20) shown in Table 23 and AO60 were melted and kneaded in the weight proportions shown in Table 27 using a twin-screw extruder (Japan Steel Works' model TEX44) at a preset temperature of 250 to 260° C.

The kneaded material in molten state was continuously transferred to a continuous polymerizer to thereby effect continuous polymerization. The thus-prepared polyester resin composition was evaluated. The results are shown in Table 27.

The polymerization temperature was 280° C., the polymerizer inside was under a reduced pressure of 0.5 to 5.0 torr (0.067 to 0.665 Mpa), the stirring by the polymerizer motor was carried out at 30 rpm, and the polymerization time was about 70 minutes.

COMPARATIVE EXAMPLE 43

The PPT resin, ME 100 and AO60 were melted and kneaded in the weight proportions shown in Table 27 in the same manner as in Example 59. The treatment for increasing the molecular weight after kneading was not performed. The evaluation results are shown in Table 27.

COMPARATIVE EXAMPLE 44

The composition was obtained in the same manner as in Example 59 except that no layered material was incorporated and also no treatment was made for increasing the molecular weight. The results of evaluation thereof are shown in Table 27.

TABLE 27

|  |  | Ex. | Compar. Ex. | |
|---|---|---|---|---|
|  |  | 59 | 43 | 44 |
| PBT | wt parts | 100 | 100 |  |
| Clay A–20 |  | 15 |  |  |
| ME100 |  |  | 10 |  |
| Treatment for increasing the molecular weight |  | Yes | No | No |
| Ash content | wt % | 17.5 | 17.9 | 17.5 |
| Proportion of particles with [D] ≦3000 Å | % | 79 | 0 | 79 |

TABLE 27-continued

|  |  | Ex. | Compar. Ex. | |
|---|---|---|---|---|
|  |  | 59 | 43 | 44 |
| Mean [D] | Å | 1320 | 25200 | 1320 |
| Number of dispersed particles [N] | particles/wt % · 100 µ² | 110 | 4 | 110 |
|  | — | 117 | 1.5 (*) | 117 |
| Mean aspect ratio | Å | 122 | ca 3 · 10⁴ (*2) | 122 |
| Mean layer thickness | Å | 480 |  | 480 |
| Maximum layer thickness |  |  | ca 9 · 10⁵ (*3) |  |
| Flexural modulus | MPa | 6840 | 3650 | 6840 |
| Flexural strength | MPa | 125 | 124 | 125 |
| Flexural strength (after 15 minutes of retention) | MPa | 118 | 119 | Unmoldable (*4) |
| Warpage (mm) | mm | 2.2 | Nonmeasurable (*5) | 22 |
| Gloss (%) | % | 87 | Nonmeasurable (*5) | 87 |

(*1) Since dispersion in platelet form was unattainable, the major axis/minor axis ratio of dispersed particles was taken.
(*2) Since dispersion in platelet form was unattainable, the number average minor axis of dispersed particles was taken.
(*3) Since dispersion in platelet form was unattainable, the maximum minor axis of dispersed particles was taken.
(*4) Unmoldable since the residence resulted in a marked decrease in viscosity.
(*5) Nonmeasurable since the molded product showed marked deformation.

As is seen in Table 27, the polyether compound treatment-free layered material failed to improve the flexural characteristics and further failed to give good flat test specimens. In the system which contained no layered material and in which no molecular weight-increasing treatment was performed, retention in molten state resulted in decreases in viscosity to such an extent that molding was impossible: the thermal stability was markedly low.

INDUSTRIAL APPLICABILITY

The present invention, which has the above constitution, can provide a polyester resin composition capable of providing moldings well balanced among physical characteristics, such as low warpage, surface appearance, elastic modulus, strength, other physical properties and heat resistance, with suppression of reduction in strength of moldings formed after retention in a molten state as a result of improvement in thermal stability in molten state. It can also provide a polyester resin composition excellent in processability into moldings as a result of stabilization of the melt viscosity thereof on the occasion of retention in molten state. It can further provide a polyester resin composition having a high level of flame retardancy such that the polyester resin will not drip on the occasion of combustion.

The invention claimed is:

1. A polyester resin composition comprising:
a thermoplastic polyester resin and
a polyether compound-treated layered material consisting of polyether and layers respectively exfoliated by one another,
which satisfies at least one of the conditions (i) to (iii) given below:

(i) That said polyether compound is represented by the general formula (2):

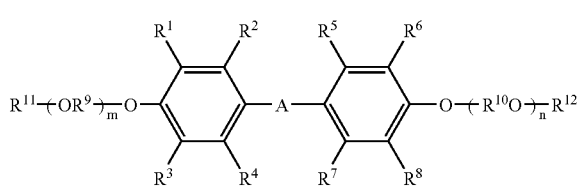

(2)

wherein -A- is —O—, —S—, —SO—, —SO$_2$—, —CO—, an alkylene group containing 1 to 20 carbon atoms or an arylene group containing 6 to 20 carbon atoms, $R^1$, $R^2$, $R^3$, $R^4$, $R^5$, $R^6$, $R^7$ and $R^8$ each represents a hydrogen atom, a halogen atom or a univalent hydrocarbon group containing 1 to 5 carbon atom, $R^9$ and $R^{10}$ each represents a bivalent hydrocarbon group containing 1 to 5 carbon atoms, $R^{11}$ and $R^{12}$ each represents a hydrogen atom or a univalent hydrocarbon group containing 1 to 20 carbon atoms, those may be the same or different, and m and n each represents the number of occurrences of the repeating oxyalkylene group provided that $2 \leq m+n \leq 50$;

(ii) That said polyester resin composition comprises a phosphorus-containing compound;

(iii) That said polyester resin composition is obtainable by melt-kneading the thermoplastic polyester resin and the polyether compound-treated layer material consisting of polyether and layers respectively exfoliated by one another and then treating the mixture for increasing the molecular weight of the polyester resin.

2. The polyester resin composition according to claim 1, wherein the phosphorus-containing compound comprises at least one member selected from the group consisting of a phosphorus-containing stabilizer and a phosphorus-containing flame retardant.

3. The polyester resin composition according to claim 2, wherein the phosphorus-containing stabilizer is a phosphite compound.

4. The polyester resin composition according to claim 2, wherein the phosphorus-containing flame retardant comprises at least one member selected from the group consisting of a phosphate ester compound and a red phosphorus compound.

5. The polyester resin composition according to claim 1, wherein the polyether compound-treated layered material consisting of polyether and layers respectively exfoliated by one another is obtainable by blending the layered material with the polyether compound in water or a water-containing polar solvent.

6. The polyester resin composition according to claim 1, wherein the polyether compound is soluble in water or a water-containing polar solvent.

7. The polyester resin composition according to claim 1, wherein the layered materials having an equivalent area circle diameter [D] of not larger than 3000 angstroms account for not less than 20% of the layered material in the polyester resin composition.

8. The polyester resin composition according to claim 1, wherein the mean value of the equivalent area circle diameters [D] of the layered materials in the polyester resin composition is not larger than 5000 angstroms.

9. The polyester resin composition according to claim 1, wherein the mean layer thickness of the layered materials in the polyester resin composition is not more than 500 angstroms.

10. The polyester resin composition according to claim 1, wherein the maximum layer thickness of the layered materials in the polyester resin composition is not more than 2000 angstroms.

11. The polyester resin composition according to claim 1, wherein the [N] value of the layered materials in the polyester resin composition is not less than 30, the [N] value being defined as the number of particles per unit weight proportion of the layered material as occurring in an area of 100 μm$^2$ of the polyester resin composition.

12. The polyester resin composition according to claim 1, wherein the mean aspect ratio (layer length/layer thickness ratio) of the layered materials in the polyester resin composition is 10 to 300.

13. The polyester resin composition according to claim 1, wherein the layered material is a layered phyllosilicate.

14. A method of producing a polyester resin composition comprising a thermoplastic polyester resin and a polyether compound-treated layered material consisting of polyether and layers respectively exfoliated by one another which comprises melt-kneading the thermoplastic polyester resin and the polyether compound-treated layered material consisting of polyether and layers respectively exfoliated by one another and then treating the mixture for increasing the molecular weight of the polyester resin.

15. The method of producing a polyester resin composition according to claim 14, wherein the layered material is a layered phyllosilicate.

16. The polyester resin composition according to claim 1, wherein the polyester resin composition comprises an epoxy-containing compound.

17. The polyester resin composition according to claim 16, wherein the epoxy-containing compound has no ester linkage.

18. The polyester resin composition according to claim 1, wherein the polyether compound-treated layered material is in a powder form.

* * * * *

UNITED STATES PATENT AND TRADEMARK OFFICE
CERTIFICATE OF CORRECTION

PATENT NO. : 7,056,963 B2 Page 1 of 1
APPLICATION NO. : 10/276798
DATED : June 6, 2006
INVENTOR(S) : Suzuki et al.

It is certified that error appears in the above-identified patent and that said Letters Patent is hereby corrected as shown below:

In the title page:

item 86 § 371 (c)(1),
(2), (4) Date:   Change "May 6, 2003" to --January 10, 2003--.

Signed and Sealed this

Twelfth Day of December, 2006

JON W. DUDAS
*Director of the United States Patent and Trademark Office*